United States Patent
Clemow

(10) Patent No.: US 10,733,343 B2
(45) Date of Patent: Aug. 4, 2020

(54) SYSTEM AND METHOD FOR THE DESIGN OF DIGITAL HARDWARE

(71) Applicant: LAMBDA LOGIC LIMITED, Salisbury (GB)

(72) Inventor: Graham Clemow, Salisbury (GB)

(73) Assignee: LAMBDA LOGIC LIMITED, Salisbury (GB)

( * ) Notice: Subject to any disclaimer, the term of this patent is extended or adjusted under 35 U.S.C. 154(b) by 0 days.

(21) Appl. No.: 16/061,604

(22) PCT Filed: Dec. 9, 2016

(86) PCT No.: PCT/GB2016/053868
§ 371 (c)(1),
(2) Date: Jun. 12, 2018

(87) PCT Pub. No.: WO2017/103572
PCT Pub. Date: Jun. 22, 2017

(65) Prior Publication Data
US 2018/0365358 A1     Dec. 20, 2018

(30) Foreign Application Priority Data

Dec. 16, 2015 (GB) .................................. 1522216.9

(51) Int. Cl.
G06F 30/331 (2020.01)
G06F 30/33 (2020.01)
G06F 30/34 (2020.01)

(52) U.S. Cl.
CPC ............ *G06F 30/331* (2020.01); *G06F 30/33* (2020.01); *G06F 30/34* (2020.01)

(58) Field of Classification Search
CPC ............. G06F 17/5027; G06F 17/5054; G06F 17/5022; G06F 30/331; G06F 30/34
See application file for complete search history.

(56) References Cited

U.S. PATENT DOCUMENTS 5,490,266 A    2/1996 Sturges
5,870,585 A    2/1999 Stapleton
(Continued)

OTHER PUBLICATIONS

JHDL—An HDL for Reconfigurable Systems, Bellows P. et al., Proceedings IEEE Symposium on FPGAS for Custom Computing Machines, Apr. 15, 1998, pp. 175-184.

*Primary Examiner* — Vuthe Siek
(74) *Attorney, Agent, or Firm* — Gordon & Jacobson, P.C.

(57) ABSTRACT

The invention is suited for use by a hardware designer for the purpose of logic synthesis and/or logic simulation. It can be used in the design of integrated circuits (ASICs) and programmable logic devices (PLDs), such as field-programmable gate arrays (FPGAs). The invention also relates to the field of hardware description languages (HDLs). Embodiments of the invention provide a computer-implemented system and method for facilitating the design of a digital circuit which comprises a plurality of logical constructs. The system is configured such that each time each logical construct is executed during a software simulation pass it is associated with a unique tag, wherein each tag can correspond to a physical aspect of a hardware representation of the design. The simulation is performed by repeated execution passes through code which implements the design, preferably wherein the same tags are associated with corresponding executions of the logical constructs during different simulation passes. A simulator object is able to store and/or maintain simulation state by retrieving it from a sole manager object, and a logical construct object is able to retrieve its initial state from the simulator object on construction and save its state on destruction. Furthermore, logical constructs can only occur within portions of code which are not conditional upon the state of any input signal.

20 Claims, 7 Drawing Sheets

(56) References Cited

U.S. PATENT DOCUMENTS

| | | | |
|---|---|---|---|
| 6,152,612 A | 11/2000 | Liao et al. | |
| 6,226,776 B1 | 5/2001 | Panchul et al. | |
| 6,449,762 B1 | 9/2002 | McElvain | |
| 7,194,705 B1* | 3/2007 | Deepak | G06F 17/5022 703/16 |
| 7,496,869 B1* | 2/2009 | Janneck | G06F 17/5045 716/103 |
| 8,082,530 B1* | 12/2011 | Ou | G06F 17/5036 716/106 |
| 8,898,610 B1 | 11/2014 | Tagore-Brage et al. | |
| 2002/0108092 A1 | 8/2002 | Yasuda | |
| 2002/0133788 A1 | 9/2002 | Waters et al. | |
| 2002/0183997 A1 | 12/2002 | Powell et al. | |
| 2007/0162269 A1 | 7/2007 | Son et al. | |
| 2009/0183134 A1 | 7/2009 | Herzl et al. | |
| 2010/0058272 A1* | 3/2010 | Bowers | G06F 17/505 716/126 |
| 2014/0059518 A1 | 2/2014 | Sierk et al. | |
| 2015/0161310 A1* | 6/2015 | Drasny | G06F 17/5031 716/102 |
| 2015/0278141 A1 | 10/2015 | Galibois et al. | |

* cited by examiner

SYSTEM AND METHOD FOR THE DESIGN OF DIGITAL HARDWARE

CROSS-REFERENCE TO RELATED APPLICATIONS

This application is the National Stage of International Patent Application No. PCT/GB2016/053868 filed on Dec. 9, 2016, which claims priority from British Patent Application No. GB 1522216.9 filed on Dec. 16, 2015, both of which are hereby incorporated by reference herein in their entireties.

BACKGROUND

1. Field

This invention relates generally to the field of electronic digital hardware design, and more particularly to the simulation and/or synthesis of such designs. The invention is particularly suited for use in the design of integrated circuits (ICs), such as application-specific integrated circuits (ASICs), and the design of programmable logic devices (PLDs), such as field-programmable gate arrays (FPGAs). The invention also relates to the field of hardware description languages (HDLs), and is suited for use by a hardware designer for the purpose of logic synthesis and/or logic simulation.

2. State of the Art

Hardware description languages (HDLs) are specialised formal languages which can be used to describe the design of electronic hardware and in particular digital logic hardware. A digital design written in an HDL may be processed in several ways which include converting it using logic synthesis and testing it using logic simulation.

Logic synthesis (also known as hardware compilation) is the process where an input design description written in an HDL is read in and converted into the appropriate form for it to be directly programmed into a target device such as a field-programmable gate array (FPGA) or for it to be manufactured into an integrated circuit (IC) such as an application-specific integrated circuit (ASIC). The programmed or manufactured device will then subsequently behave in the way specified by the HDL.

Logic simulation is the process where a design description written in an HDL is tested by a computer simulation of the design. Typically the designer will specify a set of stimulus signals for the inputs to the design and the expected response from the outputs of the design. A simulation software tool then simulates how the design specified by the HDL would behave when presented with those stimuli and checks that the outputs from the design are as expected. In addition, the simulation software tool may present its results in various forms, such as tables or graphs, for later checking by a hardware designer or other software tools.

HDLs can operate at different levels of abstraction. At the lowest level of abstraction an HDL can specify how to connect together basic logic gates such as AND gates and NOT gates. It is rare for any design nowadays to take place at this abstraction level because it is so time consuming.

An important intermediate level of abstraction is register transfer level (RTL) design. An RTL design consists of combinatorial logic and registers.

"Combinatorial logic" is digital logic which has no memory and typically consists of linked combinations of basic logic elements (known as logic "gates") such as AND gates, OR gates and NOT gates connected together without any feedback loops. More complex combinatorial logic components such as adders and multipliers can be constructed from these basic gates. When the digital inputs to a block of combinatorial logic change level (such as changing from a high logic level to a low logic level), the changes propagate through each of the component gates within the block until eventually, after a time delay, all the outputs from the block reach a steady level.

A "register" is a digital logic element which has memory. The most common type of register is called a "D-type flip-flop". The simplest form for a D-type flip-flop has two inputs and one output: a clock input, a data input and a data output. When the level of the clock input rises from a logic low level to a logic high level (known as a "rising edge" on the clock input) then whatever logic level is present on the data input (subject to certain setup and hold time restrictions) gets "stored" in the D-type flip-flop and is output to the data output after a short delay. The data output remains at this level until the next rising edge of the clock input. Other type of registers such as latches and JK flip-flops differ in their inputs and outputs and/or their response to those inputs.

When simulating an RTL design to verify its logical behaviour, the timing delays in the combinatorial logic are usually ignored. The assumption is made that the time spacing between the edges of clock signals which trigger the registers is sufficient for the combinatorial logic to have settled to a steady-state in time for each clock event. Thus a simulation of an RTL design is described as "cycle-accurate" meaning that the outputs from the design will be correct in relation to the different clock cycles of the clock signals in the design.

An HDL design at a "behavioural" or "algorithmic" level is at a higher level of abstraction than RTL. The distinguishing feature of this level is that the registers in the design are either partially or completely unspecified. Thus the results from a simulation are not cycle-accurate and during synthesis of the design the synthesis tool needs to determine the quantity, type and positioning of registers in order to meet some previously specified constraints on the circuit behaviour.

A large number of different HDLs have been developed. Some of these are languages which are dedicated to describing hardware and have their own bespoke language syntax. The most popular of these are VHDL, Verilog and System-Verilog. The advantage of a bespoke language is that it can be designed to address the precise needs of a hardware designer. The disadvantage is that it requires bespoke tools for logic simulation and logic synthesis. Another disadvantage is that the bespoke language needs to be learned by a hardware designer.

A second approach to designing an HDL is to make it compatible with an existing software programming language such as C or C++. The most popular HDL of this kind is SystemC which is based on C++. This type of HDL has the advantage that a logic simulation can be performed directly by compiling the design using a compiler for the software programming language. If a hardware design written in the HDL forms part of a system which also includes software, then part or all of the hardware design and software design can be simulated together in a system simulation. This is especially easy to perform if the HDL is based on the same software programming language as is used for the system software.

SUMMARY

The invention described in this document is based on this second approach to designing an HDL where the HDL is compatible with an existing software language. The invention uses a novel method to allow the HDL to support a full range of hardware design features while remaining fully compatible with the software language. This allows the HDL to be compiled and simulated directly using the existing tools which are available for the software language. A separate software tool, which is specific to the HDL, can convert a design into a form, such as a VHDL or Verilog design file, which can be synthesised into an FPGA or ASIC.

In this document, the term "logical construct" is intended to mean any programming language statement or part thereof which represents some physical aspect of a digital hardware design. A single logical construct may be encountered multiple times during the course of sequential program flow. For example, if the logical construct occurs within a program loop statement, each encounter is referred to as an "instance of the logical construct" or an "execution of the logical construct", and may represent a different physical aspect for each encounter. In a preferred embodiment of the invention, the representation of a 1-bit D-type flip-flop is created with a logical construct which is a C++ variable definition statement for a variable of type dff<bit>. If that C++ statement appears within a C++ loop statement which repeats 5 times then there will be 5 instances of the logical construct representing 5 separate 1-bit D-type flip-flops.

The following patents describe prior art in the field of HDLs and digital hardware design.

U.S. Pat. No. 6,226,776 has broad coverage of C-based hardware design but at a behavioural level. Its designs are not cycle-accurate. Subroutine calls and their parameters are synthesized to an entirely different form. The described algorithms make somewhat arbitrarily decisions about resource sharing. Structure member access involves a complex state machine.

U.S. Pat. No. 6,152,612 describes a C++ implementation of event driven simulation such as that used by SystemC. United States patent US 2002/108092 describes how to split a C-based design into separate code sections so that the combinatorial logic is separated from the registers. United States patent US 2007/162269 describes how to handle the events caused by multiple synchronised clocks at different frequencies. U.S. Pat. No. 5,870,585 describes the approach used by SystemC including how a C++ class can represent a hardware module with separate member functions encapsulating the combinatorial logic and the register transitions. U.S. Pat. No. 5,490,266 describes a process-oriented approach to logic design. United States patent US 2002/0133788 describes a behavioural synthesis method for converting a high level C++ description to a lower level description by automatically inserting registers.

A further group of patents refer to the "tagging" of certain aspects of a digital hardware design but none in the same way as the invention, where tags are used to match up the same instance of a logical construct on each execution pass. United States patent application US 2014/059518 relates to embedding software objects into a graphical programming language. United States patent application US 2002/183997 uses a tag to indicate which HDL should be used for simulation. U.S. Pat. No. 6,449,762 uses a tag to relate elements to each other in different forms of a design description. United States patent application US 2015/278141 uses tags to label the inputs and outputs of a message protocol. U.S. Pat. No. 8,898,610 uses tags as function IDs in ASIC cell libraries. United States patent US 2009/183134 uses "tagged" to mean "noted" and describes a procedure for managing engineering change.

For the purpose of illustrating the prior art approach for a design, FIG. 1 shows an example design with four inputs and one output which is encapsulated into a single design unit (known as a "module") which has been named prior_art_example. Two logic inputs A and B are first ANDed together and then passed to the D input of a D-type flip-flop register which is clocked by clock input CK. The output of the flip-flop Q is NORed with another module input C and the NOR gate output is passed to the module output Y.

In SystemC, the example circuit of FIG. 1 could be described as follows:

```
#include <systemc.h>
SC_MODULE(prior_art_example) {
    // Inputs
    sc_in<bool> CK;
    sc_in<bool> A;
    sc_in<bool> B;
    sc_in<bool> C;
    // Output
    sc_out<bool> Y;
    // Internal signals
    sc_signal<bool> D;
    sc_signal<bool> Q;
    void sequential_method( ) {
        Q.write(D.read( ));
    }
    void combinatorial_input_method( ) {
        D.write(A.read( ) && B.read( ));
    }
    void combinatorial_output_method( ) {
        Y.write(!(Q.read( ) || C.read( )));
    }
    SC_CTOR(prior_art_example) {
        SC_METHOD(sequential_method);
        sensitive << CK.pos( );
        SC_METHOD(combinatorial_input_method);
        sensitive << A << B;
        SC_METHOD(combinatorial_output_method);
        sensitive << C << Q;
    }
};
```

The systemc.h header file is the standard SystemC header file used to support simulation. It defines SC_MODULE, SC_CTOR and SC_METHOD as C++ macros and sc_in, sc_out and sc_signal as C++ classes. The design is essentially just a definition of a C++ class named prior_art_example with a constructor and three member functions named sequential_method, combinatorial_input_method and combinatorial_output_method. The inputs, outputs and internal signals are specified as class members.

During simulation, the code within the SC_CTOR block is executed once. It registers the member function sequential_method as a function which needs to be run whenever there is a rising edge on the clock signal CK; it registers the member function combinatorial_input_method as a function which needs to be run whenever the A or B input changes state; and it registers the member function combinatorial_output_method as a function which needs to be run whenever either the C input or the Q internal signal changes state. Subsequently the entire simulation is run by a complex library of SystemC software which tracks the changes in variables such as A, B, C, CK, D and Q and executes the member functions at the appropriate times.

There are several drawbacks to using SystemC for this example design. Firstly, it can be quite hard to debug a SystemC design during simulation because the simulation library will jump in and out of functions such as sequential_method in a way which in large designs will be hard to predict. Secondly, parts of the design which a designer might logically wish to group together may need to be split into separate member functions, as they are in the example. Thirdly, typically all D-type flip-flops will have both their D inputs and Q outputs listed as class member variables. So typically each D-type flip-flop is referenced in at least three separate places: as a class member variable; inside a sequential method which is sensitive to a clock (and possibly a reset); and inside one or more combinatorial methods. Fourthly, the C++ macros such as SC_MODULE, SC_CTOR and SC_METHOD obscure the behaviour of the underlying code.

The example code for SystemC could have been simplified somewhat for this very simple example but the layout shown is representative of how an RTL design would be structured in practice when using the SC_METHOD macro. There is an alternative way to write this SystemC example which uses the SC_THREAD macro to set up a member function which is sensitive to a clock signal and which calls a wait function to suspend execution of the member function. This avoid some of the drawbacks listed above but at the expense of making the simulation multi-threaded. This has the disadvantage of making debugging much harder and slowing the simulation execution time.

In VHDL, the example circuit of FIG. 1 could be described as follows:

```
library ieee;
use ieee.std_logic_1164.all;
entity prior_art_example is
    port (
        -- Inputs
        CK : in std_logic;
        A : in std_logic;
        B : in std_logic;
        C : in std_logic;
        -- Output
        Y : out std_logic
    );
end prior_art_example;
architecture arch of prior_art_example is
signal D : std_logic;
signal Q : std_logic;
begin
    process (CK)
    begin
        if rising_edge(CK) then
            Q <= D;
        end if;
    end process;
    process (A, B)
    begin
        D <= A AND B;
    end process;
    process (Q, C)
    begin
        Y <= NOT(Q OR C);
    end process;
end arch;
```

There are several drawbacks to using VHDL for this example design. Firstly, in order to simulate it is necessary to use a simulation test harness which is written using the tools provided for VHDL. It is difficult to combine this simulation with, for example, the simulation of software written in a language such as C++. Secondly, parts of a design which a designer might logically wish to group together may need to be split apart, as they are in the example. For example the D-type flip-flop Q output is listed as a signal at the start of the architecture body and then written to in one process and read back in another. So typically each flip-flop is referenced in at least three separate places. This slows development especially for larger designs. Thirdly, although not fully illustrated in the above example, VHDL can be quite verbose. Fourthly, the creation of D-type flip-flops needs to be done carefully as a mistake with for example a process sensitivity list can lead to unexpected results such as the creation of a latch rather than a D-type flip-flop.

An improved solution has now been devised. The invention is defined by the claims appended herein.

Thus, in accordance with the invention there is provided a computer-implemented system for facilitating the design of a digital circuit. The circuit may comprise a plurality of logical constructs. The logical constructs may be selected and arranged so as to enable the resulting hardware (i.e. a device or circuit constructed in accordance with the design) to achieve a desired, predetermined function. The resulting hardware may be an application-specific integrated circuit (ASIC) or a programmable logic device such as a field-programmable gate array (FPGA).

The system may be configured such that each time each logical construct is executed during a software simulation pass it is associated with a unique tag, wherein each tag can correspond to a physical aspect of a hardware representation of the design.

Execution of the logical construct may result in the construction of an object at run-time during simulation. The object may give rise to one or more hardware instantiations upon synthesis of the design; for example, if it appears in a loop. The object may be an instance of a software class for example a register class or a clock class. One or more classes may be provided as part of a library of classes. The library may form part of the invention. Additionally or alternatively, one or more classes may be defined by the user. The invention may enable the user-defined class to be written in a programming language. Thus, objects created at run-time during simulation can be used to represent logical constructs or elements within the design.

Alternatively, execution of a logical construct may comprise the execution of a portion of code. For example, it may comprise a module call or a software subroutine call.

Preferably, the system enables the behaviour of the design to be tested or measured by performing simulation passes through the design. The simulation pass may be performed in accordance with a design description written in a hardware description language (HDL). The first simulation pass through the design may be an initialisation ("elaboration") pass. A boolean flag within the simulator may divert control flow for all calls made to the simulator during the first simulation pass. This provides the advantage that time-consuming set ups can be run once only, without affecting the efficiency of subsequent simulation passes.

This is in contrast to some prior art arrangements, in which a class constructor performs the time consuming task of setting up connections between modules, binding ports and registering different tasks within the design. A class member function is then executed repeatedly to simulate the behaviour of the design. In accordance with the invention, however, there is no separate code for setting up. This makes the design simpler to write. During the first simulation pass through the design, all necessary structures are set up by accessing the sole simulator object.

Preferably, the simulation is performed by repeated execution passes through code which implements the design. The same tags may be associated with corresponding executions of the logical constructs during different simulation passes.

The tags function as identifiers which uniquely identify each execution of a logical construct. Preferably, once an execution of a logical construct has been associated with a particular tag, the execution of a logical construct can be identified using that same tag during subsequent simulation passes.

The system may be further configured to ensure that the tagged logical constructs can only occur within portions of code which are not conditional upon the state of any input signal. Such portions of code may, in one sense, be referred to as "input signal independent". That is, certain operations, instructions or mechanisms cannot be defined within blocks or portions of code which are dependent upon the state of any input signal or others signals derived therefrom. For example, a register definition may be prohibited from occurring within a variable length software loop statement. A synthesis component of the system may check and/or enforce the rule that tagged logical constructs can only occur within portions of code which are not conditional upon the state of any input signal.

The advantage of this is that each simulation pass through the design will encounter the logical constructs in the same order each time. The executions of the logical constructs may be referenced (identified and/or accessed) using their respective tags. In turn, this may enable the simulator of the invention to track and manage the executions of the logical constructs. This may be achieved by maintaining a counter or other tracking mechanism. The counter may be initialised (for example to zero or to some other value) at the start of a simulation step or pass, and may be incremented each time a logical construct is encountered. The counter may be used as an index into internal storage for each execution of each logical construct. Thus, on each encounter of a logical construct the counter may be assigned a unique counter value which becomes the tag for that instance of the logical construct.

The system may comprise:
a simulation component;
a synthesis component;
a specification for a hardware description language (HDL);
a set of syntactic and semantic rules for an HDL; the system may comprise software for checking and/or enforcing the set of rules;
a simulation software library; the library may comprise software class definitions and software subroutine definitions; the class definitions and subroutine definitions may define the structure and/or behaviour of objects which represent logical constructs; and/or
a synthesis conversion tool; the synthesis conversion tool may enable conversion of the design into a format which can be used to generate the resulting, target hardware.

Thus, the invention may provide a tool or collection of tools for aiding the electronic digital hardware design process. The user of such a system may be a designer of electronic digital circuits. The invention may enable the user to simulate and/or synthesize a circuit design, and analyse performance of a circuit constructed in accordance with the design.

The invention may enable the user to express or describe the design in an HDL specified in accordance with the rules of the invention.

The system is arranged to maintain information relating to the status of a simulation of the design. It may achieve this by using the tags associated with the logical constructs. The system may be configured to generate at least one simulator object, the simulator object being arranged to maintain data relating to the simulation of the design. The system may be further configured to generate a sole manager object. Preferably, the manager object has access to, and/or is in communication with, the at least one simulator object. The manager object may be a singleton object. The manager object may be accessed by portions of the code. The manager and/or simulator object(s) may be instances of software classes. The manager object may be arranged to provide a pointer or reference to a simulator object in response to a request.

Multiple simulator objects may be created. This may be of advantage in situations where, for example, the user wishes to run a number of separate simulations concurrently. An example of such a scenario might be where a number of different designs generated in accordance with the invention are to be incorporated into a larger design generated in accordance with another HDL other than the invention, for example the SystemC HDL. The SystemC simulation would then select the appropriate simulator object to simulate each different design.

The design may comprise a variety of different types of logical construct. The logical construct types may include:
a clock signal;
a reset signal;
a register;
a memory block;
a wire, wherein a wire is a mechanism which enables a signal to be read before it is written;
a tri-state signal;
a module instantiation with an associated name;
a module input signal;
a module output signal;
a module tri-state input and output signal;
a sensitivity list; this may be a list of signals within the design, possibly with attributes to indicate that only the rising edge or falling edge of a signal is significant; the sensitivity list can be used to determine when (i.e. under which circumstances) certain blocks of HDL code should be executed; the use of sensitivity lists enables the simulator to skip sections of HDL code so as to save execution time, thus improving the efficiency of the simulation; and/or a debugging element.

The system may be configured to facilitate the design of the digital circuit using a programming language. The invention may enable the user to create a representation of the digital circuit in a programming language. The programming language may be C++, a C-type language or an object-oriented language. This provides the advantage that the user is able to describe the design using syntax and programming techniques or mechanisms that are familiar.

The system may be configured to convert a design written in the programming language to a hardware design. It may enable compilation or synthesis of the design of the digital circuit into a hardware design.

The invention may enable the user to use, represent and/or manipulate an RTL abstraction of the digital circuit. In an RTL design all the registers in the design are well defined and the simulation is cycle-accurate.

The invention may provide a computer-implemented system for simulating and/or synthesizing the design of a digital circuit which comprises a plurality of logical constructs, wherein the system is configured such that:

a simulator object is able to store and/or maintain simulation state by retrieving it from a sole manager object;

an instance of a logical construct object is able to retrieve its initial state from the simulator object on construction and save its state on destruction; and logical constructs can only occur within portions of code which are not conditional upon the state of any input signal.

Also in accordance with the invention, there is provided a method corresponding to the system as described above. Any feature described in relation to the system may also be recited and used in relation to the method described below, and vice versa.

Thus, there is provided a computer-implemented method for facilitating the design of a digital circuit which comprises a plurality of logical constructs, wherein the method comprises the step of:

assigning a unique tag to each instance of each logical construct, the same tag being assigned to the same instance of a logical construct each time the logical construct is executed during a software simulation pass, wherein each tag can correspond to a physical aspect of a hardware representation of the design.

The method may comprise the step of:

simulating the design by repeatedly performing execution passes through code which implements the design; and/or associating the same tags with corresponding executions of the logical constructs during different simulation passes.

The method may comprise the step of ensuring that the tagged logical constructs can only occur within portions of code which are not conditional upon the state of any input signal.

The method may comprise the use of:

a simulation component; a synthesis component; a specification for a hardware description language (HDL); a set of syntactic and semantic rules for an HDL; a simulation software library; and/or a synthesis conversion tool.

The plurality of logical constructs may include:
a clock signal;
a reset signal;
a register;
a memory block;
a wire, wherein a wire is a mechanism which enables a signal to be read before it is written;
a tri-state signal;
a module instantiation with an associated name;
a module input signal;
a module output signal;
a module tri-state input and output signal;
a sensitivity list; and/or
a debugging element.

The method may comprise the step of:

during a simulation of the design, associating a module call in the simulation with an identifier which enables:

identification of the inputs and/or outputs of the module;
the module to function independently of the environment in which it is called.

The method may comprise the step of generating at least one simulator object arranged to maintain data relating to a simulation of the design. It may comprise the step of generating a sole manager object, wherein the manager object has access to, and/or is in communication with, the at least one simulator object.

The method may comprise any or all of the following steps:

i) using a programming language to facilitate the design of the digital circuit;

optionally wherein the programming language is C++, a C-type language or an object-oriented language;

ii) converting a design written in the programming language to a hardware design;

iii) creating a representation of the digital circuit in a programming language iv) compiling or synthesizing the design of the digital circuit into a hardware design;

v) using, representing and/or manipulating an RTL abstraction of the digital circuit; and/or vi) determining when a steady-state has been reached and that the circuit is stable.

The invention may also provide a computer-implemented method for simulating and/or synthesizing the design of a digital circuit which comprises a plurality of logical constructs, comprising the steps:

enabling a simulator object to store and/or maintain simulation state by retrieving it from a sole manager object;

enabling a logical construct object to retrieve its initial state from the simulator object on construction and save its state to the simulator object on destruction; and ensuring that logical constructs can only occur within portions of code which are not conditional upon the state of any input signal.

Advantageous features of the invention may include any or all of the following:

Simulation occurs within a single simulation loop by repeated passes through the design.

Elaboration, which is the process of preparing for efficient simulation, may occur transparently to the user as an extra, initial simulation pass.

The elaboration pass may take some time to set up its internal structures in the most efficient way; however, subsequent simulation passes are fast and therefore the simulation is efficient.

The entire design is executed in the same sequence for every loop. There is no scheduling or context switching required.

The simulation may be controlled by a sole (singleton) object which can be hidden from the user (for example behind subroutine interface calls and software classes).

The concept of "input signal independence" (i.e. portions of code whose execution are independent of any input signal or signals derived from them) ensures that logical constructs which need to coordinate with the simulator, such as clock signals, reset signals, registers, and wires, do so in the same order for each simulation pass through the design.

Registers, which are a fundamental building block of any digital hardware design, are specified just once at their point of use.

Clock and reset signals can be applied implicitly to a group of registers rather than being specified explicitly for each one in turn.

"Wires" work round the difficulty that in a module hierarchy a signal value may be needed during a simulation before it has been calculated.

Sensitivity lists can be used to avoid the inefficiency of repeatedly executing the same code while still allowing the simulator to maintain track of the objects which it is managing.

Other features such as tri-state signals, multiple simulators, memory blocks and debugging elements all work from the same common principles: that the simulator singleton is available in the background to save and restore data associated with any logical construct wherever it occurs within the module hierarchy provided it is within an "input signal independent" statement.

Any feature described above in relation to one aspect or embodiment of the invention may also be applied to any other aspect(s) or embodiment(s) of the invention.

These and other aspects of the present invention will be apparent from and elucidated with reference to, the embodiment described herein. An embodiment of the present invention will now be described, by way of example, and with reference to the accompanying drawings.

BRIEF DESCRIPTION OF THE DRAWINGS

FIG. 1 is a schematic of a digital circuit which is used to illustrate the prior art approaches to hardware design.

FIG. 2 is a flow diagram which shows the steps involved in logic simulation for the preferred embodiment of the invention.

FIG. 3 is a flow diagram which shows the steps involved in logic synthesis for the preferred embodiment of the invention.

FIG. 4 is a schematic of a digital circuit which is used to illustrate some simple features of the preferred embodiment of the invention.

FIG. 5 is a schematic of a digital circuit which is used to illustrate the effect of placing a register logical construct inside a software loop in the preferred embodiment of the invention.

FIG. 6 is a schematic of a digital circuit which is used to illustrate the method of constructing a design hierarchy in the preferred embodiment of the invention.

FIG. 7 is a schematic of a digital circuit which is used to illustrate the behaviour of D-type flip-flops in the preferred embodiment of the invention.

FIG. 8 is a schematic of a digital circuit which is used to illustrate the behaviour of wires, which are logical constructs which allow a signal to be read before it is written, in the preferred embodiment of the invention.

FIG. 9 is a flow diagram which shows the steps involved in box 302 of FIG. 3 for the preferred embodiment of the invention, which is the logic synthesis from a design written in the HDL of the invention to a lower HDL such as VHDL or Verilog.

DETAILED DESCRIPTION

The invention provides a toolkit which facilitates the design and production of an electronic circuit. A preferred embodiment enables the simulation, synthesis and debugging of the design. Thus, the invention may comprise various logical constructs arranged and configured for the performance of these different design-related tasks.

A key aspect of the present invention is the provision of a novel hardware description language (HDL) which eliminates or at least alleviates drawbacks arising from the use of known HDLs. A preferred embodiment of the invention provides the following:

(1) The design of a language—traditionally referred to as a hardware description language (HDL)—which is compatible with a subset of an existing software language such as C++. The language provides an advantageously simple and elegant structure which allows electronic designs to be expressed more compactly than with existing HDLs such as System C, Verilog and VHDL.

(2) A set of syntactic and semantic rules for the HDL which among other things ensure that the key language elements such as registers are so positioned in the flow of execution when simulating that they naturally perform their required function.

(3) A simulation software library and supporting software header files which ensure that a design conforms to the language syntax when simulating a design using a software compiler such as a C++ compiler.

(4) A synthesis tool which converts a design to its equivalent representation in VHDL, Verilog or some other intermediate format whereupon it can be further converted using existing tools into a binary file suitable for programming an FPGA or taping out an ASIC.

In the following illustrative description, the language provided in accordance with the invention is compatible with the C++ software language. Throughout this document, examples are given to illustrate the different features of the invention. However, it should be noted that the invention can be arranged in relation to languages other than C++ and the HDL could have a syntax different from that as described herein. The invention is not to be limited in this regard to the syntax used for illustrative purposes herein, or the choice of known language that it is compatible with.

Figure 1:
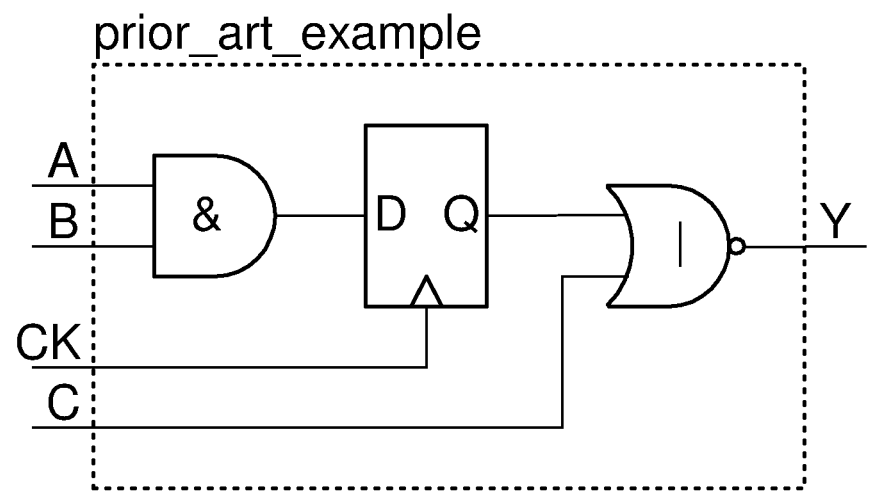
FIGS. 1 to 9 show electronic circuits and flow diagrams which are used herein to illustrate the prior art solutions, and enable them to be contrasted with the solution provided by embodiments of the present invention.

An illustrative embodiment of the HDL of the invention may be considered to be similar to SystemC in the sense that it is compatible with C++. However, such an embodiment is simpler to use for both design and simulation purposes, because it has been optimized for the commonest use case of a design consisting of just combinatorial logic and D-type flip-flop registers. Unlike SystemC it does not require the use of C++ macros and simulates in a much simpler way. Using the HDL of the invention, the example circuit of FIG. 1 could be described as follows:

```
#include <simlib.hpp>
void prior_art_example(
    in<implicit_clock> CK,
    in<bit> A,
    in<bit> B,
    in<bit> C,
    out<bit> Y)
{
    dff<bit> my_reg;
    my_reg.d = A && B;
    Y = ! (my_reg.q || C);
}
```

Here, the design of the circuit is contained in a single C++ function definition known as a "module" definition. Inputs are of type in<implicit_clock> or in<bit> and outputs are of type out<bit>. in, implicit_clock, bit, out and dff are C++ classes defined within the standard simlib.hpp header file. A clock signal defined with type implicit_clock becomes the clock signal for all D-type flip-flops which are within its scope (unless overridden by a later clock definition). A variable of type dff<bit> is a D-type flip-flop register of type bit and in this example it is clocked on the rising edge of CK because that is the clock signal which is within scope when the variable is defined. The bit data type behaves similarly to the C++ bool boolean data type.

The dff<bit> class has two public member variables (using C++ terminology): d which is the flip-flop input and q which is the flip-flop output. So the register input is set to A ANDed with B and the register output is NORed with the input c and fed to the module output Y.

By comparison with SystemC and VHDL, the HDL of the invention is far more concise. The D-type flip-flop is defined, read and written within three adjacent source code lines. Although the preferred embodiment of the invention supports sensitivity lists, these are optional for the designer and only affect the simulation performance and for a simple example such as this one are unnecessary. As will be shown later the simulation for this example is very fast.

The HDL of the invention supports both simulation and synthesis.

Figure 2:
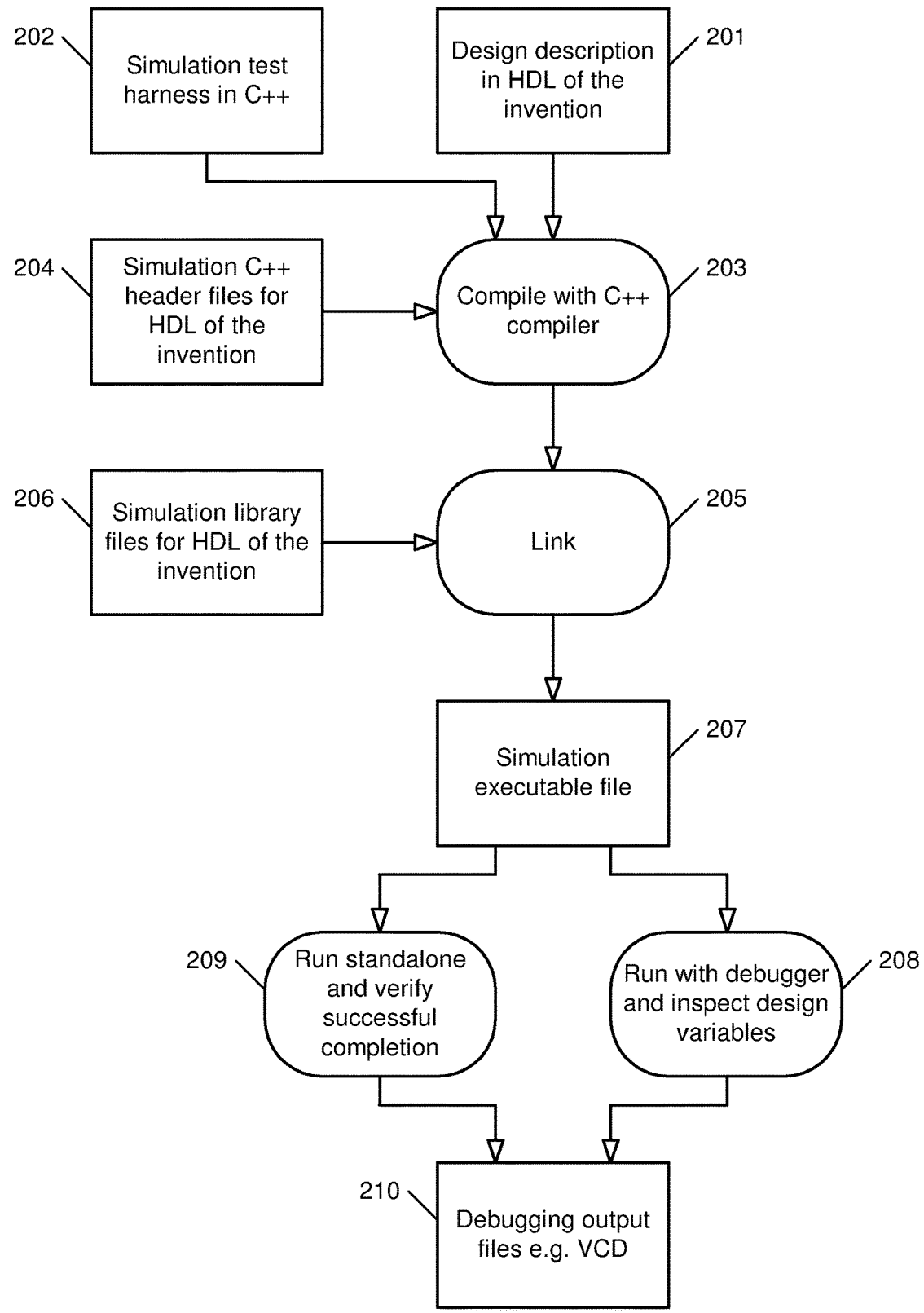

FIG. 2 is a block diagram showing how simulation is performed for the preferred embodiment of the invention which is based on the C++ programming language. This design flow is essentially the same as for other HDLs such as SystemC which are also based on C++. A designer creates one or more design files 201 which are written in the language of the HDL of the invention. The designer also creates a simulation test harness 202 written in C++ which exercises the design 201. The design files 201 and the test harness 202 are compiled by a standard C++ compiler 203. The design files 201 require the inclusion of standard header files 204 which define the C++ classes such as in and dff which provide the functionality for the HDL of the invention. The compiler 203 creates output object files which are passed to a linker 205 which links the design files with any libraries 206 needed to support the HDL of the invention. The output from the linker is an executable file 207 which may be run to test the design. If the compiler and linker have included the necessary debugging information then the design may be run within a debugger 208 which may be used to perform standard C++ debugging functions such as stepping through the code for the design and inspecting the values of the variables in the design. Alternatively, the executable for the design may be run standalone 209 and be left to complete and report any errors which it encountered. During the course of the run, the test harness 202 and the design under test 201 may generate output files 210 such as debugging files in VCD (value change dump) format.

Figure 3:
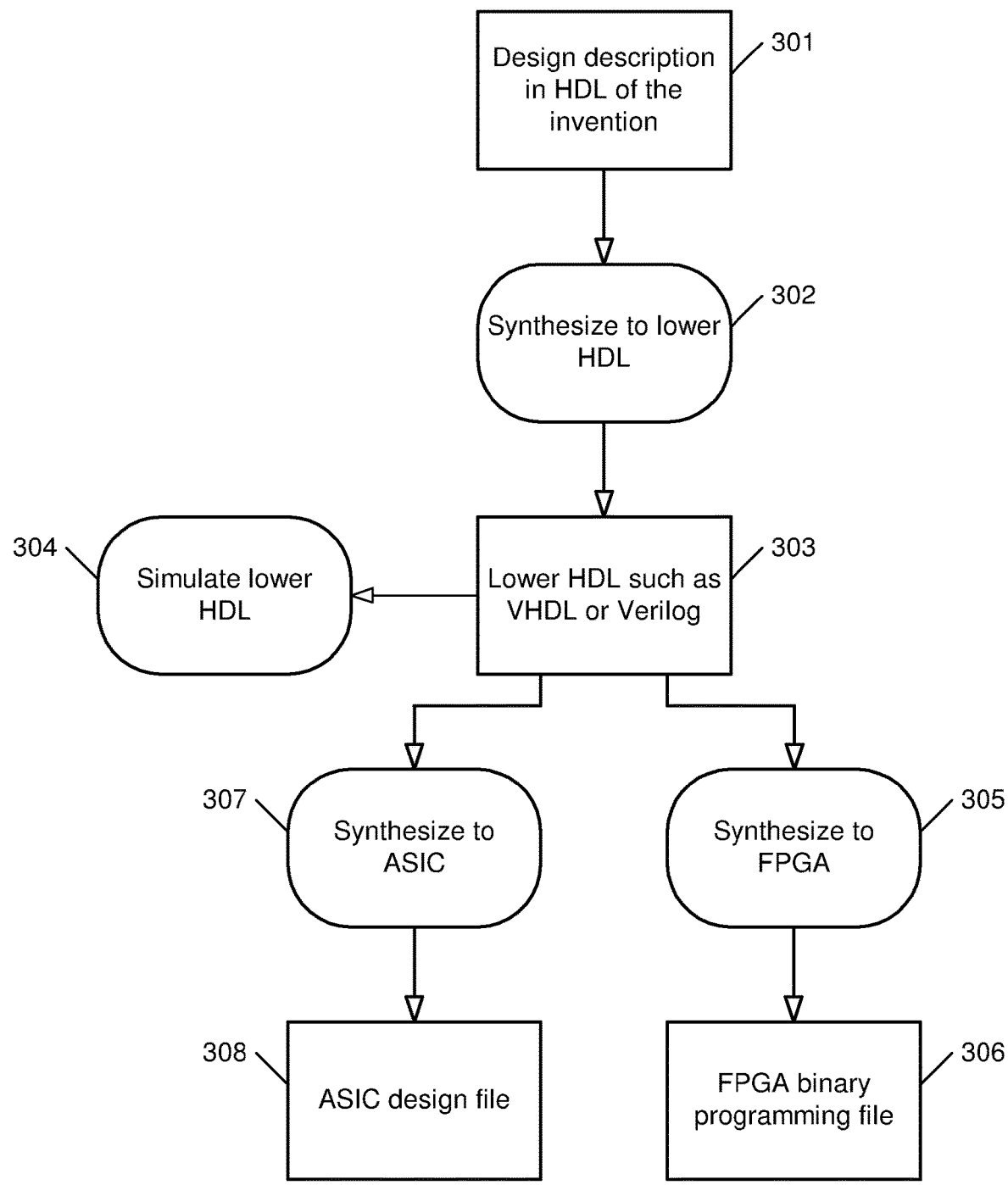

FIG. 3 is a block diagram showing how synthesis is performed for the preferred embodiment of the invention. 301 is the same as 201 from FIG. 2 and is the design files which are written in the language of the HDL of the invention. An executable synthesis tool 302 (shown in more detail in FIG. 9 and described later) converts the design to another lower HDL 303 such as VHDL or Verilog. This may then be simulated if required using the normal simulation methodologies for this lower HDL 304. If the target device is a programmable logic device such as an FPGA, then the lower HDL is synthesized further 305 into a binary programming file 306 which is used to program the FPGA. If the target device is an IC such as an ASIC, then the lower HDL is synthesized further 307 into whatever type of design file 308 is required by the IC or ASIC manufacturer.

A fundamental aspect of the present invention is the way in which it enables a design to be simulated. This utilises the singleton software design pattern, where any part of the software can access a single shared object of some C++ class. In accordance with an embodiment of the invention, the singleton is a simulator manager which on request can provide a pointer to a simulator object. The simulator object retains information about the design and its current simulation status. The features of the design which communicate with the simulator manager and the simulator are referred to as "logical constructs" and these may include C++ classes and C++ function calls.

Consider the very simple design shown in FIG. 4 which has the code shown below when represented in the HDL of the preferred embodiment of the invention.

```
#include <simlib.hpp>
void simple(in<implicit_clock> CK, in<bit> A, in<bit> B, out<bit> P) {
    dff<bit> r;
    r.d = A && B;
    P = r.q;
}
```

In the case of the simple design example shown above, the classes in<implicit_clock>, in<bit>, out<bit> and dff<bit> are all examples of logical constructs. These communicate with the simulator object as supplied by the simulator manager singleton. Typically this communication takes place in the C++ class constructor and C++ class destructor of the relevant logical construct. A C++ class constructor is a function which is called automatically when a class object such as r is first defined (as in the line dff<bit> r;). C++ class destructor is a function which is called automatically when a class object goes out of scope (when simple exits in the case of r).

For brevity, in the descriptions which follow, the term "simulator" is used as meaning the simulator object which is supplied on request by the simulator manager singleton and coordinates the simulation process.

An example test harness for testing the simple design is:

```
void runStep(bool TEST_CK, bool TEST_A, bool TEST_B,
    bool EXPECT_P) {
        bool OUT_P;
        sim_begin_step( );
        do {
            inst("U_simple");
            simple(TEST_CK, TEST_A, TEST_B, OUT_P);
        } while (!sim_end_step( ));
        if (OUT_P != EXPECT_P) {
            std::cout << "Simulation error" << std::endl;
        }
}
void runTest( ) {
    runStep(false,  true,   true,   false);   // Test 1
    runStep(true,   true,   true,   true);    // Test 2
    runStep(false,  false,  true,   true);    // Test 3
    runStep(true,   false,  true,   false);   // Test 4
    runStep(false,  false,  false,  false);   // Test 5
    runStep(true,   false,  false,  false);   // Test 6
}
```

Here, runStep tests the effect of applying particular test input values TEST_CK, TEST_A and TEST_B to the inputs CK, A and B respectively of the simple module under test and then checks that the P output from simple matches the expected value EXPECT_P. runTest makes repeated calls to runStep to test out different input combinations.

sim_begin_step and sim_end_step are function calls which surround the code under test and communicate with the simulator. The do while loop allows multiple passes to be made through the design under test until the design has settled to a steady state. Each execution of the do while loop is referred to as a "simulation pass" and each collection of simulation passes which culminate in the loop exiting (because sim_end_step has returned true) is referred to as a "simulation step".

The number of simulation passes required to complete a simulation step is determined by the simulator and depends both on the structure of the design under test and in some cases the actual test input values. In the example test harness, tests 1, 2, and 4 will require two simulation passes to complete and tests 3, 5 and 6 will require just one. This is because tests 2 and 4 require the propagation of a changed value on the D-type flip-flop Q output and test 1 requires an extra simulation pass for "elaboration".

The very first simulation pass is used by the simulator as an initialisation pass referred to as the "elaboration" pass. The simulator uses the elaboration pass to set itself up for the simulation which is to follow by constructing efficient internal data structures. A boolean flag inside the simulator diverts the control flow for all calls made to the simulator during this first pass and allows time consuming set ups to be run just once without affecting the efficiency of subsequent simulation passes. (The test of the boolean flag is the only extra overhead). During the elaboration pass, the simulator sets up all its internal structures and performs any memory allocations which are required by the design. In the case of the design simple, the simulator allocates memory for the contents of the D-type flip-flop r, initialises r to a power-up default value (which is false if not specified explicitly) and records which implicit_clock object is within scope for determining when the D-type flip-flop r gets clocked.

On subsequent simulation passes, when r in simple is constructed, the dff<bit> class constructor retrieves the current state of the register from the simulator (via the simulator manager singleton) and uses it to initialise its q output. So the r.q output becomes immediately available for reading. The destructor for r notifies the simulator of the value on its d input just before it is destroyed. At the end of the simulation pass, sim_end_step can check whether the design has settled to a steady-state (more on this later) and if so whether there are any D-type flip-flops which need to be clocked.

In the case of simple, there are at most two normal (i.e. non-elaboration) simulation passes per clock cycle. On the first simulation pass the d input to r is stable and if the simulator detects a rising clock edge it can afterwards transfer the reported d input value across to the storage for the q output. Then, if the q output has changed, the simulator can request a second simulation pass (by returning false from sim_end_step) so that the new r.q output value can be transferred across to the P output.

In this simple example there is only a single D-type flip-flop but in a typical design there will be a large number of them along with many other logical constructs such as module inputs and outputs. An important aspect of the invention is how the simulator can correctly maintain the association between the storage it holds for logical constructs such as D-type flip-flops and their occurrence within the HDL code when it is executed during simulation. The HDL of the invention comprises design rules which only allow logical constructs such as D-type flip-flops to be constructed within blocks of code which are not dependent on the state of any input signal. In practice this means that the execution of a D-type flip-flop dff class constructor and the execution of other logical constructs cannot occur within an "if" statement or a variable length loop statement where the controlling condition depends on the state of one or more input signals or on the state of any other variables whose values might change directly or indirectly in response to an input signal change. A C++ statement, such as the one which constructs a D-type flip-flop using the dff class, is a statement which must be "input signal independent". All the aspects of the HDL of the invention which are described as "logical constructs" may only appear in statements which are input signal independent. The synthesis tool of the invention checks a design written in the HDL language of the invention to check that this rule applies.

Due to this rule for input signal independence, each simulation pass through a design will execute logical constructs such as registers in the same order each time. The simulator can therefore track and manage these logical constructs by tagging them as they are executed. There are many ways to do this but the preferred embodiment of the invention maintains a single counter inside the simulator which is zeroed at the start of a simulation pass and then is incremented each time a logical construct is executed. The simulator uses the counter value as an index into internal data structures. It also passes the counter value (the "tag") back to the constructors for certain logical constructs so that they can report their tags back to the simulator when they are destroyed. This is useful for allowing the simulator to check for violations of the input signal independence rule. It is also essential for certain logical constructs such as module inputs and outputs (using the in and out classes) where their order of destruction may, according to the C++ language standard, not be the reverse of their order of construction. In this case it is essential for the destructor for an in or out class to report its tag back to the simulator.

In the test harness example above, the variables to receive the inputs and outputs are declared as being of type bool whereas the actual module inputs and outputs are of type bit (i.e. in<bit> and out<bit>). This is a feature of the in and out classes that they will automatically convert compatible data types so that the design behaves as expected.

Hierarchical Example Design

Figure 5:
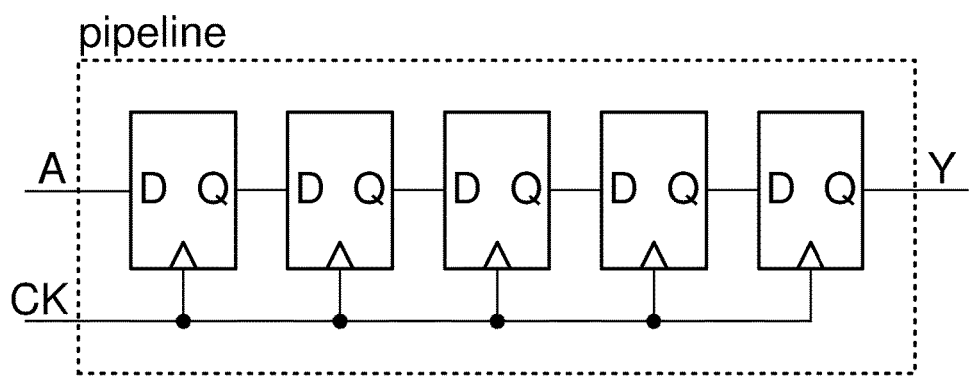
Figure 6:
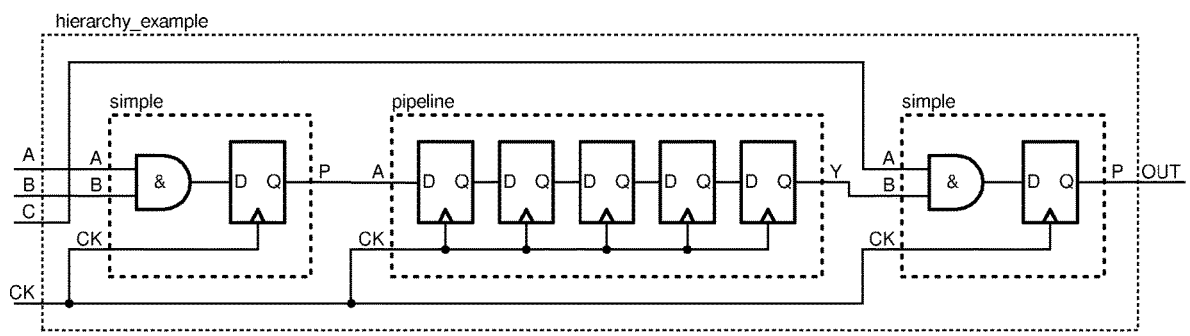

The following provides further design examples, as shown in FIG. 5 and FIG. 6, which add some hierarchy to the design. Suppose that a designer wishes to delay a signal by five clock cycles. One way to design this is as follows as shown in FIG. 5 (simlib.hpp header file inclusion omitted):

```
void pipeline(
    in<implicit_clock> CK,
    in<bit> A,
    out<bit> Y)
{
    bit temp = A;
    for (int i = 0; i < 5; i++) {
        dff<bit> pipe;
        pipe.d = temp;
        temp = pipe.q;
    }
    Y = temp;
}
```

Because the dff<bit> pipe; statement is within a fixed length loop each execution of this statement is input signal independent. When simulating, the dff<bit> object pipe will be constructed five times and each time the simulator will use a different storage location for saving and restoring the state of the D-type flip-flop. So the result is five different D-type flip-flops connected together in a chain, as shown in FIG. 5.

FIG. 6 shows a new top level module named hierarchy_example which incorporates the simple and the pipeline modules into a module hierarchy. The two input signals A and B are first passed through one instance of the module simple, then the result is passed through the module pipeline to delay the result and then the result from pipeline is passed to another instance of the module simple along with a third input c.

In accordance with the preferred embodiment of the invention, the HDL code for this could be as follows:

```
void hierarchy_example(
        in<implicit_clock> CK,
        in<bit> A,
        in<bit> B,
        in<bit> C,
        out<bit> OUT)
{
        bit simple1Out;
        inst("U1"); simple(CK, A, B, simple1Out);
        bit pipelineOut;
        inst("U2"); pipeline(CK, simple1Out, pipelineOut);
        inst("U3"); simple(CK, C, pipelineOut, OUT);
}
```

When module hierarchy_example is simulated there will be seven different D-type flip-flops which will be handled by the simulator in the order that they are encountered. Because the order of execution of the logical constructs in the design (such as the module calls and the D-type flip-flops) is input signal independent, the simulator can, during each simulation pass through the design, match up each instance of each logical construct with the correct associated storage as allocated during the simulator elaboration pass.

The calls to inst are an important feature of the invention. In a preferred embodiment, it is a language requirement that any module call (such as the calls to simple or the call to pipeline) is immediately preceded by a call to inst which supplies an instance name for the module call. This name is the instance name used in the Verilog or VHDL output from the synthesis tool of the invention.

The syntax for inst serves a further purpose. The call to inst notifies the simulator that there is a module call coming. The simulator can then identify all the inputs and outputs of the module when the in and out objects are constructed for the module arguments in the subsequent argument list. The list of inputs and outputs is needed for the sensitivity list feature (see later). The inst call also allows the simulator to reset the context so that no settings from the current module (such as which implicit_clock is currently within scope) carry over into the sub-module. This is essential for ensuring that each module operates independently of the environment in which it is called (with the exception of the arguments passed as inputs and outputs of course).

The following features are also provided in accordance with a preferred embodiment of the invention.

Simulator Manager

In accordance with a preferred embodiment of the invention there is, by default, a single simulator object which is accessed via the simulator manager singleton. This is likely to be adequate for most designs. However it is possible that a user (designer) may wish to run a number of separate simulations concurrently. An example would be if a number of different designs generated in accordance with the invention were interfaced into a larger SystemC design.

The invention provides C++ function calls to handle this situation. New simulators can be created with sim_create_simulator and an existing simulator can be selected with sim_get_simulator. The selection would need to be made before the start of a simulation step (the sim_begin_step call).

A possible C++ class definition of the simulator manager class for the preferred embodiment of the HDL is as follows:

```
class SimulatorManager {
public:
        // Singleton instance
        static SimulatorManager& instance( );
        // Destructor
        ~SimulatorManager( );
        // External interface calls
        SimHandle createSimulator( );
        SimHandle getSimulator( ) const;
        void setSimulator(SimHandle handle);
        void deleteSimulator(SimHandle handle);
        void deleteAllSimulators( );
        // Get the current simulator. There will always be one.
        Simulator* currentSimulator( ) const { return currentSimulator_; }
private:
        // Initialise and add a single default simulator to the map.
        SimulatorManager( );
private:
        // The current handle (always valid).
        SimHandle currentHandle_;
        // The current simulator (always valid)
        Simulator* currentSimulator_;
        // Map of all simulators (including the default simulator)
        typedef std::map<SimHandle, Simulator*> MapType;
        MapType map_;
        // Next SimHandle value to be assigned
        SimHandle next_;
};
```

The SimulatorManager instance call returns a reference to a singleton simulator manager object. A possible implementation for this is:

```
SimulatorManager& SimulatorManager::instance( ) {
        static SimulatorManager singleton;
        return singleton;
}
```

This is a conventional implementation of the singleton design pattern. This allows a reference to the single simulator manager object to be obtained anywhere within the simulation code with a call to Simulator Manager::instance( ).

There are four private data members of the simulator manager class: currentHandle_, currentSimulator_, map_ and next_.

currentSimulator_ points to the current simulator and is always valid. The rules for the preferred embodiment of the invention are such that there is always a current simulator. So even if all existing simulators are deleted (such as with a call to deleteAllSimulators) a new default simulator will immediately be created and made the current simulator. The advantage of this approach is that the simulation library does not need to check that a simulator exists each time the current simulator is requested. To obtain a pointer to the current simulator a logical construct can call SimulatorManager::instance( ).currentSimulator( ). An efficient C++ compiler will reduce this to one or two pointer lookups which are very fast to execute.

The preferred embodiment of the invention uses a handle to refer to existing simulators. SimHandle is a data type which is defined to be the same as the C++ std::uint32_t type. The simulator manager assigns handles when a new simulator is created by using the map_ and next_member variables. The map_member variable is a mapping from a simulator handle to a simulator object pointer. The next_ member variable holds a suggested value for the next handle to assign. When creating a new simulator, the simulator manager checks that the handle suggested by next_ is not already in use by looking it up in map_ and if it is it increments next and tries again until successful. Once successful, the new handle and simulator pointer are entered into map_.

The remaining implementation of the SimulationManager class is straightforward for anyone skilled in C++ programming. The member calls such as createSimulator and getSimulator are, in the preferred embodiment of the invention, wrapped within non-member functions such as:

```
inline SimHandle sim_create_simulator( ) {
    return SimulatorManager::instance( ).createSimulator( );
}
```

The simulator manager class implementation shown above does not allow for the simulator manager to be used in a multi-process or multi-threaded environment which may be necessary for certain simulation applications. This is possible to achieve using standard programming techniques which are familiar to anyone knowledgeable in the art. In the multi-threaded version of the preferred embodiment of the invention, the static singleton variable defined in SimulatorManager::instance( ) is made thread-local so that each thread has its own simulator manager and as a consequence its own distinct set of simulators. An alternative approach would be to have a single simulator manager object for all threads or processes and use standard techniques to protect against simultaneous access to the simulator manager from different processes or threads.

Bit Vectors

The examples above have worked exclusively with boolean types which model single connections in an electronic circuit using the bool C++ type and the bit type (which is specific to the HDL of the preferred embodiment of the invention). A collection of these connections can be grouped together to form an integer valued bus with a range based on the number of connections in the group. This is a standard feature of all existing HDLs: for example VHDL has a STD_LOGIC_VECTOR type and SystemC has a sc_int type.

In the preferred embodiment of the invention, the bit vector type is supported by the class uvec<N> which is an unsigned bit vector type and svec<N> which is a signed bit vector type. N is the number of bits in the type (and is a C++ template argument). N can be of any positive size, and by the appropriate use of C++ template techniques, such as deriving from a templated base class with multiple specialisations, the implementation of the simulator can be made to work efficiently in terms of both memory usage and execution time. So the simulator implementation of a uvec<7> could derive from a base class which stores its value in an 8 bit unsigned char type whereas a uvec<100> could derive from a base class which stores its value in a 2 element array of the 64 bit std::uint64_t type.

The invention's features such as registers and wires (discussed below) work just as well with bit vector types. So a dff<uvec<7>> is a register of D-type flip-flops where the d input and q output are both uvec<7> bit vectors.

The invention can also be arranged to support composite types such as arrays and structures (also sometimes called aggregates). Any of these types can also be used for registers or wires.

In the preferred embodiment of the invention, an important distinction is made between the HDL-specific data types such as bit, uvec<N> and svec<N> and the built-in C++ data types such as bool, int, and std::uint64_t. The HDL-specific types are signal types and must be used for module inputs and outputs and any other signals derived from them. The C++ data types must have values which are input signal independent and during synthesis, once all loops have been unrolled, all variables with C++ data types must evaluate to constants. So in general, if a conditional statement or a loop statement has a controlling condition which is of a C++ data type, then the body of the statement may contain logical constructs because the body is input signal independent. If the controlling condition is of an HDL-specific data type then unless the condition has a constant value, the body of the statement may not contain logical constructs.

Clock Signals

In the preferred embodiment of the invention, the C++ data type implicit_clock is a logical construct which represents a clock signal which implicitly becomes the clock input for any registers or memories which are within scope of the C++ definition of the implicit_clock object. Later implicit_clock definitions override earlier ones for as long as they remain in scope (until the implicit_clock destructor is called).

Here is an example which uses three different implicit clocks:

```
void my_mod(in<implicit_clock> clk1, in<bit> b, ...) {
    // clk1 is the implicit clock for statements here
    ...
    {
        implicit_clock clk2 = !clk1;
        // clk2 is the implicit clock for statements here
        ...
    }
    // clk1 is the implicit clock again
    // ...
    implicit_clock clk3 = b;
    // clk3 is now the implicit clock for statements here.
    ...
}
```

In the preferred embodiment of the invention the implicit_clock class is defined as follows in a simulation library header:

```
class implicit_clock {
public:
    implicit_clock(bool x);
    implicit_clock(bit x);
    implicit_clock(const implicit_clock& x);
    implicit_clock(const implicit_clock_proxy& x);
    implicit_clock(const implicit_clock_stimulus& x);
    implicit_clock(const in<implicit_clock>& x);
    ~implicit_clock( );
    bit read( ) const;
    implicit_clock_proxy operator!( ) const;
    static implicit_clock_stimulus h1( );
    static implicit_clock_stimulus 1h( );
private:
    void operator=(const implicit_clock&);
    Tag tag_;
    bool level_;
};
```

The C++ constructors for implicit_clock send to the simulator (via the simulator manager singleton) the current level on the clock and if appropriate the tag for any other clock that this clock is derived from. The simulator responds with a tag for this clock which the constructor stores in the tag_ member variable. The constructor also stores the current level on the clock in the level_ member variable.

During the elaboration pass, the simulator adds the tag for each implicit clock to an internal stack which it maintains. The implicit clock at the top of the stack is the one which will apply to subsequent registers (and memory blocks). The destructor for an implicit clock notifies the simulator which, during elaboration, removes it from the top of the internal stack of clock tags. (Because of the C++ rules for when constructors or destructors are called for local variables, the destructor will always find its object at the top of the stack. This may not apply for other software languages which may need to use the tag for the clock object being destroyed to find it in its internal stack). The simulator processes its internal stack during its elaboration pass only. After elaboration the only information the simulator needs to store is the new level on a clock so that it can detect rising and falling clock edges by comparing this level with a stored previous level.

Once constructed, an implicit_clock object cannot be assigned to (which is why the operator=assignment operator is declared as private). Furthermore it is forbidden to use an implicit_clock directly in an expression. If the clock signal needs to be an input into combinatorial logic then the level on the clock must be obtained first by calling the read member function. The exception is that the inverted version of the clock may be obtained as a proxy object by using the ! logic inversion operation. This proxy object may then be used to construct a new clock as is shown for clk2 in the example above.

The purpose behind these rules is to allow the simulator to track clock usage, to determine how clocks are derived from each other and to detect which clocks are used as inputs into combinatorial logic blocks. Providing the simulator with this information has two advantages:

Firstly, the simulator can handle registers such as D-type flip-flops more efficiently by grouping together those registers which have an identical source clock (and have the same reset scheme). This allows the simulator to respond very efficiently to clock events affecting these registers and update them all simultaneously using a simple C++ memcpy operation.

Secondly, the simulator test harness can allow a input clock signal at the top level of the design to be driven by a special test stimulus object of type implicit_clock_stimulus such as implicit_clock::hl( ). The simulator manages this stimulus during simulation by first running simulation passes with a high '1' logic level applied to the input clock and then, once the simulation has stabilised, running some more simulation passes with the clock at a low '0' logic level. The features described above allow the simulator to optimise this situation. For example if the simulator knows that the only registers and memories which use the clock are sensitive to its rising edge only and that the clock is not an input to combinatorial logic, as determined by the absence of any .read( ) calls, then the second set of simulation passes with the clock at a low '0' logic level are unnecessary. Thus all the simulator needs to do is mark that the clock has now returned to a low level. The simulator does not need to execute any more passes through the design under test which is a major simulation time saving.

Reset Signals

In the preferred embodiment of the invention, the C++ data types implicit_async_reset, implicit_sync_reset and implicit_no_reset are logical constructs which represent reset signals (or the lack of a reset signal) which implicitly control the reset input for any registers which are within scope of the C++ definition of the reset object. Later reset definitions override earlier ones for as long as they remain in scope (until the destructor is called).

In accordance with an embodiment of the invention, there are three different kinds of reset definition. If a variable is defined with type implicit_async_reset and assigned a boolean value then all registers within scope of the definition are reset whenever the boolean value is true. If a variable is defined with type implicit_sync_reset then the same applies except the reset is delayed until the rising edge of whichever clock variable of type implicit_clock is within scope for the register. If a variable is defined with type implicit_no_reset then it disables the reset input for all registers within its scope. If a module does not have any inputs of type in<implicit_async_reset> or in<implicit_sync_reset> then there is an implicit implicit_no_reset in force at the start of the module.

The simulator implementation for the reset data types follows a similar pattern to that for implicit_clock and has similar advantages.

Registers

The term "register" is used to mean a storage element possibly consisting of multiple bits which has the ability to retain its state in a hardware design. An example of a register is the dff<T> data type which represents one or more D-type flip-flops storing data of type T. The preferred embodiment of the invention only supports the dff register type but other embodiments could allow other register types such as a latch type to represent a latch or a jkff type to represent a JK-type flip-flop. The principles of operation behind these other types would be the same as for the dff type.

The example designs described above used a simplified form of a D-type flip-flop register with only two inputs: clock and data. In the preferred embodiment of the invention, this is extended to include other inputs such as a reset input which controls when the register is reset; a reset data input which provides the output level during a reset; a clock enable input which gates the clock signal to the register; and a power up or initialisation level which provides the output level immediately after power-up or simulator initialisation.

There is a free choice to be made over the HDL language syntax for specifying these different types of register input. In accordance with the invention, the following syntax is used.

The clock input and the reset input to a register are made implicit by a prior declaration of a C++ object of type implicit_clock, implicit_async_reset, implicit_sync_reset or implicit_no_reset as described above.

The clock enable input, the data input and the data output of the D-type flip-flop are made public data members of the dff<T> class named ce, d and q respectively so that they can be conveniently read and written using the C++ dot operator for class member access. The clock enable and data inputs may be written to multiple times and the value when the D-type flip-flop is destroyed is the value which is used to control the flip-flop updates.

The clock enable input may optionally be supplied with an initial value as a dff<T> constructor argument. If omitted it defaults to true meaning that the D-type flip-flop is always enabled.

The reset data input and the power up data input default to false or zero which is the usual default level expected by a designer. If required they can be set by calling the init member function during the elaboration pass. These flip-flop inputs are captured during the elaboration pass and do not change throughout a simulation.

There follows an example design which illustrates two registers operating with implicit clocks and resets. The schematic for this design is shown in FIG. 7.

```
void reg_example(
    in<implicit_clock> CK,
    in<implicit_async_reset> RST,
    in<bit> CE,
    in<bit> A,
    in<uvec<3>> B,
    out<bit> P,
    out<uvec<3>> Q)
{
    dff<bit> ra(CE);
    implicit_clock CK2 = !CK;
    dff<uvec<3>> rb(ra.q);
    rb.init(5, 3);
    ra.d = A;
    rb.d = B;
    P = ra.q;
    Q = rb.q;
}
```

There are two D-type flip-flop registers ra and rb both of which have an asynchronous reset RST with ra being reset to the default value of false and rb being initialised during power-up to 5 and reset to the value 3 as set by the init call. Register ra is clocked by the rising edge of input CK and register rb is clocked by the rising edge of clock cLK2 which is the same as the falling edge of input CK. Register ra has a clock enable controlled by the external CE input. Register rb has a clock enable controlled by the q output of ra.

Figure 7:
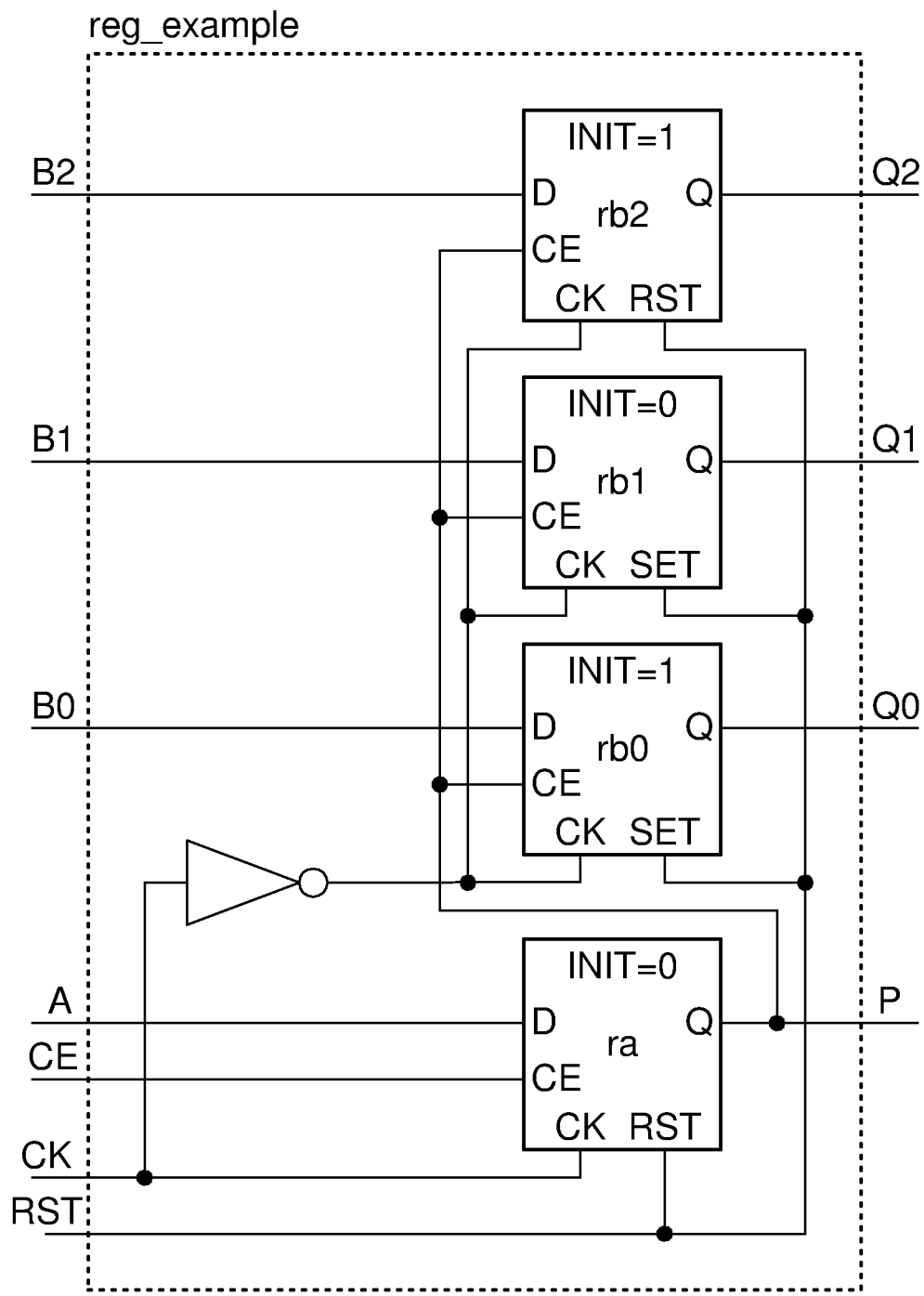

In FIG. 7, rb has been shown divided into the three bits rb2, rb1 and rb0 which make up the uvec<3> data type. The power-up initialisation value is shown by the INIT=legend inside each D-type flip-flop. (A power-up initialisation value is only relevant to a design for a PLD which supports this feature.) The reset data value is shown as connections to either a SET input which sets the D-type flip-flop to a logic high '1' level or a RST input which sets the D-type flip-flop to a logic low '0' level.

According to the preferred embodiment of the invention, the C++ class declaration for the dff<T> class is implemented as follows in the simulation library header file:

```
template <typename T> class dff {
public:
    static_assert(DffTrait<T>::isValid, "Invalid type T for dff<T>");
    dff( );
    dff(bit ce_);
    ~dff( );
    void init(const T& value);
    void init(const T& power_up_value, const T& reset_value);
private:
    dff(const dff<T>&);
    void operator=(const dff<T>&);
    Tag tag_;
public:
    T q;
    T d;
    bit ce;
};
``` dff is a template class. In the preferred embodiment of the invention, the template parameter T can be of signal type bit, uvec<N> or svec<N> or a composite type such as a structure or array of these types. The C++ static_assert checks at compile time that the type T is valid for a dff type so an attempt to compile for example dff<bool> will result in a compiler error message.

There are two forms for the dff<T> constructor. The version without any arguments defaults the initial clock enable value ce to true whereas the other version allows an initial value for ce to be supplied. Both constructors set the d value to false or zero (using the C++ mems et function to set the memory for d to zero) and then sends to the simulator a pointer to the q value along with its size (using the C++ expression size of (T)). During the elaboration pass, the simulator records the order of occurrence of the different D-type flip-flops in the design and for each one reserves storage for the current q value, the d value at dff destruction and the reset value supplied to any init call. During normal simulation passes, the simulator copies its stored q value across to the location pointed to by the q pointer supplied by the dff constructor. Note that the simulator does not need to understand the data type T, it just needs to know its size so that is can copy blocks of memory of this size to and from the dff<T> object. The simulator also supplies a tag to the dff<T> constructor which is stored as the tag_ private member variable.

The dff<T> destructor also communicates with the simulator and sends it the stored tag in tag_, the size of the type T, a pointer to the d member variable and the boolean value of the ce member variable. The tag and the data size are both used by the simulator for checking that the rules regarding input signal independence have been met. The simulator copies to its internal storage for d the value of the d member variable if the ce input is true or the existing q value if the ce input is false. Therefore the stored d value becomes the appropriate next value for q regardless of whether ce is true or false. The simulator does not update its stored q value at this stage because it cannot determine whether more simulation passes will be needed before this can occur.

The two init calls supply the power up data value and the reset data value. The single argument version of the call supplies both as a single value whereas the two argument version allows them to be set separately.

A dff<T> type cannot be copied or assigned so the C++ copy constructor and assignment operator are made private.

The simulator performs an important optimisation during the call to sim_end_step at the end of the initial elaboration pass. As each dff<T> constructor is encountered during the elaboration pass, the simulator records which source clock signal and source reset signal the D-type flip-flop is controlled by. At the end of the elaboration pass, the simulator can regroup the storage assigned to each D-type flip-flop so that the storage associated with all the q outputs in the same clock and reset group are allocated contiguously in one large block of memory of known size. Similarly the simulator storage for the d inputs and the reset data values are grouped together. Then at the end of each normal simulation pass, the simulator only needs to step through the clock and reset groups (of which typically there will be few) to determine whether the condition for updating the D-type flip-flops in that group have been met. If they have then the updating of all the D-type flip-flops in that group can be achieved by copying either the storage for the d value or the storage for the reset data value to the storage for the q value using a single call to the fast C++ memcpy function. Furthermore, a single call to the fast C++ memcmp function beforehand allows the simulator to detect whether any of the q outputs are going to change as a result of the update. If none of the D-type flip-flop q outputs change then the simulator does not need to run an additional simulation pass after the update.

Wires

In accordance with the invention and as intended herein, the term "wire" has a special meaning and refers to a special type of signal which may be read before it is written.

When a module instantiates other sub-modules, it may be impossible to order the calls to these sub-modules so that each module's input values are available at the time of the call. For example if one module is a bus controller and the other is a bus peripheral then there will be a bidirectional flow of signals between these modules.

The solution in these situations is for the calling module to declare one or more variables using the wire template class. This is a logical construct which represents a signal and which initially adopts an arbitrary value and then iterates to the correct value under control of the simulator. The simulator achieves this by storing the state of the wire object when it is destroyed and then initialising the same wire to the same value when it is constructed again on the next simulation pass. The simulator continues making repeated passes through the design (by returning a false value from sim_end_step) until all wire signals have reached a steady-state. If there are any D-type flip-flops in the design, then the simulator will only handle a clock or reset event on these once all the wires in the design have stabilised.

A C++ definition of an object of type wire is an example of a C++ statement which is a logical construct and thus must be input signal independent. This ensures that on each simulation pass, the simulator encounters each wire construction and destruction in the same order.

Figure 8:
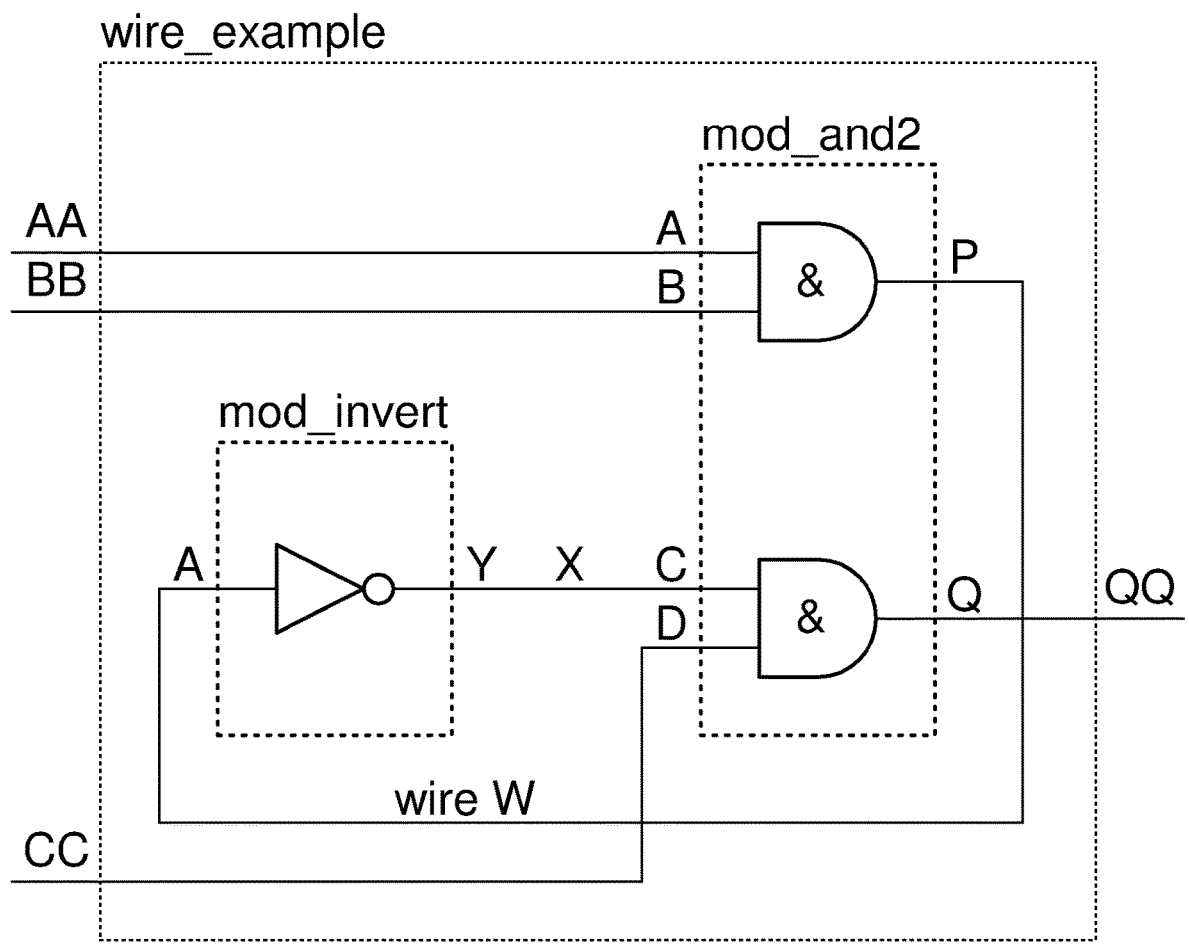

Consider the example shown in FIG. 8 in which a single inverter has been placed in a module named mod_invert and a pair of boolean ANDs have been placed in module mod_and2. The top level module wire_example then ANDS two input signals AA and BB using one of the ANDS from mod_and2, inverts the result by passing it through mod_invert, and then ANDS the result with another input signal cc again using mod_and2.

```
void mod_invert(in<bit> A, out<bit> Y) {
    Y = !A;
}
void mod_and2(in<bit> A, in<bit> B, in<bit> C, in<bit> D,
              out<bit> P, out<bit> Q) {
    P = A && B;
    Q = C && D;
}
void wire_example(in<bit> AA, in<bit> BB, in<bit> CC, out<bit> QQ) {
    wire<bit> W;
    bit X;
    inst("U_invert"); mod_invert(W, X);
    inst("U_and2"); mod_and2(AA, BB, X, CC, W, QQ);
}
```

FIG. 8 illustrates why a wire is unavoidable for designs such as this one. The module mod_invert requires as its input the output P from module mod_and2. Similarly the module mod_and2 requires as an input the output Y from module mod_invert. So swapping the order of sub-module calls in module wire_example does not help—in that case the signal x instead of W would need to be made a wire. So a wire here is inevitable (unless of course all the logic is placed in a single module).

In the preferred embodiment of the invention, the C++ class declaration for the wire class in the simulator library header file has the following form:

```
template <typename T> class wire : public T {
public:
    static_assert(WireTrait<T>::isValid, "Invalid type T for wire<T>");
    wire( );
    ~wire( );
    template <typename U> wire<T>& operator=(const U& x);
    wire<T>& operator=(const wire<T>& x);
private:
    wire(const wire<T>&);
    Tag tag_;
};
``` wire is a template class. In the preferred embodiment of the invention, the template parameter T can be of signal type bit, uvec<N> or svec<N> or a composite type such as a structure or array of these types. The C++ static_assert checks at compile time that the type T is valid for a wire type.

The wire class is publicly derived from a base class of type T which holds the value of the wire object. This allows a wire object to be used directly in any C++ expressions which are valid for the base type T.

The wire constructor takes no arguments as the entire purpose of the wire is for it to be initialised by the simulator to whatever value it ended with at the end of the previous simulation pass. The assignment operator allows a wire to be assigned subsequently a value of any type U which is convertible to type T.

The wire is simulated as follows. During the initial elaboration pass, the wire<T> constructor requests the simulator to set aside storage for an object of type T. This storage is initialised to zero or false. (It could be initialised to anything but this makes the simulator behaviour predictable). Then during a normal simulation pass, when the wire is constructed it is set to whatever its stored value is. So the wire object has a value which can be used immediately. When the wire is destroyed, it sends the current value of the wire to the simulator. The simulator then first compares this value with the stored value and notes if it is different. The simulator then copies the supplied value from the wire object to the storage area for that wire. If at the end of a simulation pass, the simulator had noted that one or more wire objects have changed state during that pass, then the simulator runs another simulation pass (by returning false from sim_end_step) which will use the new values which have been set into the storage areas for the wire objects. This process repeats through possibly a number of simulation passes until there is a complete simulation pass where all the initial values applied to each wire object exactly match the final values on those wire objects as they are destroyed. At this point the simulator can update any registers in response to clock edges or resets and if necessary the simulator can continue with further simulation passes. This process will always complete within a finite number of simulation passes and the resulting wire object values will always be correct and unique provided that the design does not contain any combinatorial logic feedback loops. (The simulator can prevent the simulation step from running indefinitely by counting the number of simulation passes in the simulation step and exiting with an error if it exceeds some configurable total which is higher than that which can occur for a correct design.)

A test harness for testing the wire_example design in FIG. 8 could be implemented as follows:

```
void runStep(bool AA, bool BB, bool CC, bool expectedQQ) {
    bool QQ;
    sim_begin_step( );
    do {
        inst("U_wire_example");
        wire_example(AA, BB, CC, QQ);
    } while (!sim_end_step( ));
    if (QQ != expectedQQ) {
        std::cout << "Simulation error" << std::endl;
    }
}
void runTest( ) {
    runStep(true, true, true, false);    // Test 1
    runStep(true, true, false, false);   // Test 2
    runStep(false, true, true, true);    // Test 3
}
```

The first simulation pass for Test 1 is the elaboration pass. The simulator storage area for wire W is set to false (the default).

In the next simulation pass for Test 1, wire W is initialised to false by the simulator (from the storage area) and inverted by mod_invert so that X is true. mod_and2 then sets wire W to true (true AND true) and the wire_example module output QQ to true (true AND true). When the wire W is destroyed the simulator detects that its final value (true) is different from its initial value (false) and so requests another simulation pass. The final value for W (true) is stored by the simulator.

In the next simulation pass for Test 1, wire W is initialised to true by the simulator (from the storage area) and inverted by mod_invert so that X is false. mod_and2 then sets wire W to true (true AND true) and the wire_example module output QQ to false (false AND true). When the wire W is destroyed the simulator detects that its final value (true) is the same as its initial value (true) and indicates that the simulation step is complete (sim_end_step returns true). The final value for W (true) is stored by the simulator.

So including the elaboration pass, Test 1 requires 3 simulation passes through the design.

In the first simulation pass for Test 2, wire W is initialised to true by the simulator (from the storage area) and inverted by mod_invert so that X is false. mod_and2 then sets wire W to true (true AND true) and the wire_example module output QQ to false (false AND false). When the wire W is destroyed the simulator detects that its final value (true) is the same as its initial value (true) and indicates that the simulation step is complete (sim_end_step returns true). The final value for W (true) is stored by the simulator.

So Test 2 requires just a single simulation pass through the design.

Using similar reasoning, Test 3 requires two simulation passes through the design because it causes the wire object to change level.

At the start of each simulation step, the simulator could initialise the storage for any wires to any value it wishes and the correct results would still occur after the appropriate number of simulation passes. The preferred embodiment of the invention adopts an algorithm which uses the final value from the last simulation pass of the last simulation step as the initial value for the first simulation pass of the next simulation step. This is likely to be the optimal choice for most designs. In a typical logic circuit design, many signals will remain unchanged for large numbers of clock cycles. In this case this algorithm will ensure that any wires for these signals are initialised to their optimal value. If all the wires in a design are initialised correctly (as in Test 2 above) then only a single simulation pass will be needed for the wires to stabilise.

Modules

In the preferred embodiment of the invention, a module is called or "instantiated" using two consecutive statements. First the inst call supplied a name for the instantiation and this is followed by the call to the C++ function which implements the module.

In an alternative embodiment of the invention it may be possible to supply the instantiation name as one of the arguments of the module function call but this does not work for C++ where the order of evaluation of functions arguments is undefined according to the C++ language standard. Thus in C++, the separate inst call allows the simulator for the HDL of the invention to detect that a module instantiation is to follow.

The inst call sends the name of the instance to the simulator which during the elaboration pass stores it internally in such a form that during any subsequent simulation pass, and at any position within the design, the simulator is able to report the hierarchy of module instance names which lead to the current module being executed. This is useful for debugging purposes.

If a module instantiation occurs within a loop, then the same instantiation name will get repeated for multiple instantiations. In the preferred embodiment of the invention, the simulator and the synthesis tool append a unique suffix to the name (such as "_2") to make the instantiations within each module unique. In an alternative embodiment, the language syntax for the inst call could support arguments other than a simple text string so that the user (designer) can select their own unique instantiation names.

In the preferred embodiment of the invention, a module input has a data type of in<T>. The C++ class declaration for the in class in the simulator library header file has the following form:

```
template <typename T> class in : public T {
public:
    static_assert(InTrait<T>::isValid, "Invalid type T for in<T>");
    template <typename A> in(const A& value);
    in(const in<T>& x);
    ~in( );
private:
    template <typename U> in<T>& operator=(const U& x);
    in<T>& operator=(const in<T>& other);
    template <typename U> in<T>& operator+=(const U& x);
    ... (same for -= *= ++ etc.)
    Tag tag_;
};
``` in is a template class. In the preferred embodiment of the invention, the template parameter T can be of signal type bit, uvec<N> or svec<N> or a composite type such as a structure or array of these types. The C++ static_assert checks at compile time that the type T is valid for an in type.

The in class is publicly derived from a base class of type T which holds the value of the in object. This allows an in object to be used directly in any C++ expressions which are valid for the base type T.

The constructor for in accepts any type A but at compile-time its implementation checks that the type A is convertible to T. The constructor then copies the value of the argument of type A to the base class of type T. The constructor also notifies the simulator that an input has been constructed and sends the simulator a pointer to the input value stored in the base class and the size of this value (using the C++ size of (T) expression). During the elaboration pass the simulator may reserve internal storage for storing the value of the input if it detects later that the input is needed for the operation of a sensitivity list (see below). The simulator returns a tag to the constructor which it stores in the tag_ private member variable.

The destructor for in returns the tag stored in tag_ to the simulator so that the simulator can check for correct operation.

Various member functions are declared as private to prohibit any operations which would modify the value of the input.

In the preferred embodiment of the invention, a module output has a data type of out<T>. The C++ class declaration for the out class in the simulator library header file has the following form:

```
template <typename T> class out : public T {
public:
static_assert(OutTrait<T>::isValid, "Invalid type T for out<T>");
    out(T& x);
    out(wire<T>& x);
    out(out<T>& x);
    out(unsigned char& x);
    ... constructors for other C++ integral types
    ~out( );
    template <typename U> out<T>& operator=(const U& x);
    out<T>& operator=(const out<T>& x);
    template <typename U> out<T>& operator+=(const U& x);
    ... (same for -= *= ++ etc.)
private:
    template <typename U> out(in<U>& x);
    Tag tag_;
    void* dst_;
    size_t dstSize_;
};
``` out is a template class. In the preferred embodiment of the invention, the template parameter T can be of signal type bit, uvec<N> or svec<N> or a composite type such as a structure or array of these types. The C++ static_assert checks at compile time that the type T is valid for an out type.

The out class is publicly derived from a base class of type T which holds the value of the out object. This allows an out object to be used directly in any C++ expressions which are valid for the base type T. Therefore within a module an output variable may be read back once it has been assigned to.

The constructor for out accepts a wide range of types and stores a pointer to the destination for the output value in the private member variable dst_ along with the size of the destination variable in dstSize_. The destination is only updated when the module exits and the output object is destroyed. The constructor also notifies the simulator that an output has been constructed and sends the simulator the size of the template type T (using the C++ size of (T) expression). During the elaboration pass the simulator may reserve internal storage for storing the value of the output if it detects later that the there is a sensitivity list for the module (see below). The simulator returns a tag identifier to the constructor which it stores in the tag_ private member variable.

The destructor for out returns the tag stored in tag_ to the simulator so that the simulator can check for correct operation. It also sends the simulator a pointer to the final output value stored in the base class of type T. If the module has a sensitivity list then the simulator copies this output value either to or from its internal storage depending on whether the module was executed or skipped by the sensitivity conditions. See below for more information on the sensitivity list. Finally the destructor copies the value from the base class across to the value pointed to by the dst_ member variable. The dstSize_ member variable allows the destructor to perform any data conversions from the type T to the original type of the constructor argument. (In the preferred embodiment of the invention there is a sufficiently small set of allowed destination types that a single dstSize_ member variable is sufficient for discrimination. Other embodiments may need other member variables to fully record the conversions which are required.)

The out class implements various operator functions which allow the output variable to behave the same as a normal writeable signal variable.

Sensitivity Lists

Languages such as SystemC, VHDL and Verilog use sensitivity lists to determine when to execute certain blocks of HDL code. A sensitivity list identifies which input signals into the block will cause a change in either the internal state of the block (such as registers) or the outputs from the block. For a boolean signal, the sensitivity list may also specify whether the block is sensitive to only the rising edge or the falling edge of that signal. A simulator will only execute a block of HDL code controlled by a sensitivity list if at least one of the signals in the list has made a transition which the block is sensitive to.

For languages such as SystemC, VHDL and Verilog the sensitivity list can affect the logic behaviour of the design after synthesis. In the preferred embodiment of the invention, a sensitivity list is an optional feature which is a logical construct which can be used to improve the efficiency of simulation but which has no effect on synthesis. When a sensitivity list is not used in a module, the simulator will execute that module fully on every simulation pass. If a sensitivity list is used, the simulator may, when appropriate, skip the execution of the body of the module and then set the outputs of the module to the correct values.

The preferred embodiment of the invention only supports a single sensitivity list per module which either executes the entire module or executes none of it. An alternative embodiment of the invention could allow any block of HDL code within a module to have a sensitivity list, although this would requires some additional syntax and a new type of logical construct to hold the outputs from the block. So instead, to keep the HDL syntax simple, in accordance with a preferred embodiment of the invention a sensitivity list is restricted to the inputs to a module and if present must appear first in the body of the module before any other statements.

Figure 4:
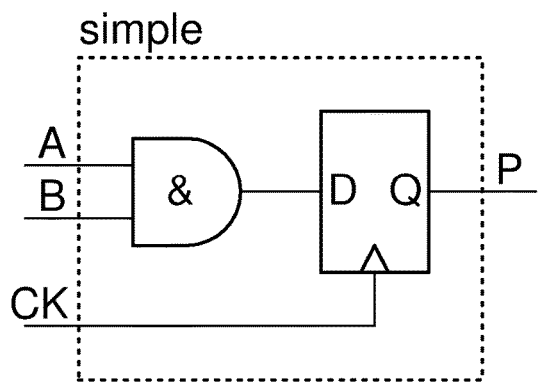

The following code provides the simple module in FIG. 4 with a sensitivity list:

```
void simple(in<implicit_clock> CK, in<bit> A, in<bit> B, out<bit> P) {
    if (sensitive(CK.rising( ))) {
        dff<bit> r;
        r.d = A && B;
        P = r.q;
    }
}
```

Because the output P only changes when the D-type flip-flop r changes, and because r is clocked by the rising edge of CK, the module only needs to be executed when the clock input CK changes from false to true. The call to sensitive has the dual function of notifying the simulator that the module is only sensitive to the rising edge of the CK input and also testing whether this condition has been met. If it is not met then the module exits immediately so saving simulation time.

There is a more generalised syntax for the sensitivity list when a module is sensitive to multiple signals. For example if the prior_art_example module from FIG. 1 had a sensitivity list then this would be written as:

if (sensitive( )<<CK.rising( )<<C) {

In accordance with the invention, the sensitive call actually constructs an object rather than being a simple function call. The constructor for this object notifies the simulator when it is constructed and relays the list of inputs to which it is sensitive and which are passed to it using the <<C++ operator.

During the elaboration pass, the simulator reserves storage for the module inputs which are in the sensitivity list and also reserves storage for all the module outputs. (The simulator knows what the inputs and outputs are by monitoring all the constructors for objects of type in and out which have been called since the last constructor call for an object of type inst). During the elaboration pass, the test of the state of sensitive always return a true boolean value to ensure that the code is fully executed. This ensures that the elaboration pass always executes all the HDL code. When a module is exited during the elaboration pass the destructors for all the out objects notify the simulator that the module is exiting so that the simulator can record its internal state such as its current position within the expected lists of logical constructs such as registers and wires.

In subsequent simulation passes, the simulator compares the new module inputs with the stored values for the inputs from the previous simulation pass. If at least one of the inputs in the sensitivity list has changed then the module will be executed. When it completes, the destructors for the out objects will notify the simulator of their output values so that they can be stored in the storage area set up by the sensitive call. If none of the inputs in the sensitivity list have changed then the simulator updates its internal state to the state stored during the elaboration pass and also copies to the module outputs the stored output values from the previous complete simulation pass. The module therefore behaves as if it had been fully executed.

Memory Blocks

A common feature of FPGA and ASIC designs is embedded memory blocks. These typically are structured as an array of memory elements which can be accessed by referring to one element using an address input and then reading or writing that element using a read data output or a write data input respectively. Typically there will a range of configurable features for the memory block such as multiple access ports, registered inputs or outputs, write enable controls and individual byte controls. Other functional memory blocks such as FIFOs (first in first out) memories may be supplied as library elements which are implemented in terms of a simpler form of memory block.

An embodiment of the invention could define separate logical constructs for the different types of memory block and allow them to be both simulated and synthesized. However this would require a large number of different logical constructs to cover all the different types of memory block structure. Instead, in the preferred embodiment of the invention, some simple memory building blocks are supplied as logical constructs which can be simulated but not synthesized. The designer then selects the type of memory component they wish to use for their design from the FPGA or ASIC vendor library (or a third-party library) with a VHDL or Verilog interface and writes an a C++ declaration for this module showing its inputs and outputs which is written in the HDL language of the invention. The design written in the HDL of the invention can then be synthesized using this C++ declaration to make the correct connections to the external memory block which will be synthesized separately from VHDL or Verilog. The designer can then also write a C++ function definition for the module, for use when simulating in C++, which uses the simple memory building blocks provided by the invention to replicate the functionality of the memory component.

In the preferred embodiment of the invention a memory block is specified using a statement such as:

mem<10, uvec<8>>m;

The mem class is a template class which takes two template argument. The first argument is the logarithm to the base 2 of the number of element in the memory block. Thus in the example above the memory block has 1024 (2 raised to the power 10) elements. The second argument is the data type of one element. Thus in the example the data type is an 8 bit unsigned bit vector.

In the preferred embodiment of the invention the mem class has the following C++ class declaration:

```
template <int N, typename T> class mem {
public:
    mem( );
    ~mem( );
    T read(const uvec<N>& addr) const;
    void write(const uvec<N>& addr, const T& wdata);
private:
    mem(const mem<N, T>&);
    void operator=(const mem<N, T>&);
    Tag tag_;
};
```

The constructor for a mem object sends the simulator the dimensions of the memory block and the simulator reserves storage for it during the elaboration pass. The simulator returns a tag which the constructor stores in the tag_ private member variable.

The read and write member functions also communicate with the simulator which reads or writes its internal storage for the memory block. These functions send the tag from tag_ to the simulator so that the simulator can identify the correct memory block.

A memory block with registered read port can be easily modelled by registering the output data with a D-type flip-flop implemented with the dff class. A memory block with a registered write input cannot be modelled in a similar way because the simulator will need to ensure that writes to the memory block only occur after sufficient simulation passes have taken place for the signals such as the write address to have stabilised to the correct value. For this reason, the preferred embodiment of the HDL supports another logical construct which represents a memory write port which is specified using a statement such as:

mem_write_port<10, uvec<8>>wp (m);

The template argument for the memory write port must match those for the corresponding memory block. The write port constructor takes a single argument which is a reference to the memory block for which this is the write port.

In the preferred embodiment of the invention the mem_write_port class has the following C++ class declaration:

```
template <int N, typename T> class mem_write_port {
public:
```

```
        mem_write_port(mem<N, T>& m);
        ~mem_write_port( );
    private:
        mem_write_port(const mem_write_port<N, T>&);
        void operator=(const mem_write_port<N, T>&);
    private:
        Tag tag_;
    public:
        T wdata;
        bit wr;
        uvec<N> addr;
    };
```

The constructor for a mem_write_port object sends the simulator the dimensions and tag for the associated memory block. During the elaboration pass, the simulator associates the write port with the correct memory block and also records which implicit clock of type implicit_clock is in scope as the memory write port is constructed. The simulator returns a tag for the memory write port which the constructor stores in the tag_ private member variable.

The three public member variables wdata, wr and addr are used to write to the memory block. When the memory write port destructor is called, the destructor sends to the simulator the levels on these 3 member variables. At the end of the simulation pass, when sim_end_step is called, the simulator checks to see if the design has stabilised. If it has, then at the same time as updating any D-type flip-flops the simulator updates any memories which have write port writes pending. This occurs if the stored wr level for the memory write port is true. The write data from the stored wdata is stored in the memory block at the address given by the stored addr.

Memory blocks with multiple synchronous write ports may be simulated by having multiple instances of the mem_write_port object for the same memory block. Thus the pair of logical constructs mem and mem_write_port allow any complexity of memory block to be simulated.

Tri-State Signals

A tri-state boolean logic signal is a signal which may driven to logic high '1', or driven to logic low '0', or left undriven in which case it either "floats" at an indeterminate logic level or gets "pulled" to a logic level by a pull-up or pull-down resistor (or similar device). Tri-state signals are used infrequently internally within FPGAs and ASICs but are commonly used for the signals on external pins of a device. Consequently, any HDL needs to support tri-state signals.

In the preferred embodiment of the invention, a tri-state signal is represented by a logical construct which has the C++ data type tri<T>. This has a C++ declaration as follows (some details omitted):

```
        template <typename T> class tri : public T {
        public:
            tri( );
            tri(const T& pull_value);
            ~tri( );
            template <typename A, typename B>
                void write(const A& value, const B& mask);
        private:
            Tag tag_;
            T pullValue_;
            T writeValue_;
            T writeMask_;
        };
```

The template parameter type T represents the type of the tri-state signal and can be of signal type bit, uvec<N> or svec<N> or a composite type such as a structure or array of these types. The tri<T> class derives from a base class of type T which is the value of the tri-state used for reading.

The tri-state signal is written to by calling the write member function with a pair of arguments: a value to write and a mask which has a logic high '1' bit at any bit position which should be written and a logic low '0' bit at any bit position which should be left undriven. Multiple calls may be made to write with the calls being combined into the private member variables writeValue_ and writeMask_. The class raised an error if the same bit is driven both high and low in the same simulation pass.

The constructor for a tri<T> object may optionally be supplied with a pull level for any undriven bits which defaults to false or zero and this is stored in the pullValue_ member variable. When the tri<T> object is destroyed, the destructor resolves the values in pullValue_, writeValue_ and writeMask_ into a new value for the tri-state which becomes the next value for the base class (and therefore the read value) on the next simulation pass.

The tri<T> object communicates with the simulator in order to save the resolved write value and recover it as the read value on the next simulation pass. In this regard the tri<T> object behaves in a similar way to a wire<T>. The simulator will continue to make passes through a design (by returning false from sim_end_step) until the value which the constructor recovers from the simulator to use as the read value is identical to the resolved write value calculated by the destructor and saved by the simulator. The simulator can apply a similar optimisation to that it uses for the wire type and arrange all the storage for tri<T> objects to be consecutive so that the testing to see if any tri-state signals have changed state can be achieved with a single memory comparison (a C++ memcmp operation) and the updating of the simulator storage if at least one bit has changed can be achieved with a single memory copy (a C++ memcpy operation). Thus the simulator handling of tri-state signal can be performed efficiently.

When a tri-state signal is passed as a module argument the preferred embodiment of the design passes it using the data type iotri<T> which has a constructor which takes a reference to an object of type tri<T>. The iotri<T> class uses a combination of the algorithms which apply to the tri, in and out classes so that the tri-state signal behaves correctly with sensitivity lists.

Debugging Elements

When debugging a design, it is useful to be able to capture the state of signals deep within the module hierarchy. This could be done by routing these signals out via output ports but for a signal deep within the hierarchy this will entail changes to multiple modules. Instead, the invention makes it simple to design logical constructs which can be used to aid the debugging of a design. These are used for simulation only and are ignored during synthesis.

The preferred embodiment of the invention provides two mechanisms for debugging which are logical constructs referred to as "debugging elements". A call to sim_vcd_dump within any module is a debugging element which allows a value to be written out to a file. This call takes two arguments: a text string identifying a variable and the value of that variable. The call sends these values to the simulator which records the text string and reserves storage for its value during the elaboration pass and then on subsequent simulation passes saves the supplied value to that storage. At the end of a simulation step (when sim_end_step is about to return true), the simulator outputs all the values from the final simulation pass of the simulation step to a VCD (Value Change Dump) file which is an IEEE standard format for HDL debugging output. In order for this to work correctly with sensitivity lists, the simulator needs to copy out the previous values for all variables being dumped which are skipped by any sensitivity list. By the appropriate optimisations during elaboration, the simulator can accomplish this with a single memory copy operation (a C++ memcpy call) for each module with a sensitivity list.

A call to sim_save is another debugging element which operates similarly and has similar arguments but instead of writing the value to file it is stored by the simulator and can be retrieved once the simulation step has finished by calling sim_restore with the same text string argument.

Synthesis

The sections above have described the different logical constructs in the preferred embodiment of the invention and how these are simulated. This section describes how a complete design in the HDL of the invention is synthesized into a VHDL or Verilog intermediate form. This step is shown as box 302 in FIG. 3.

Figure 9:
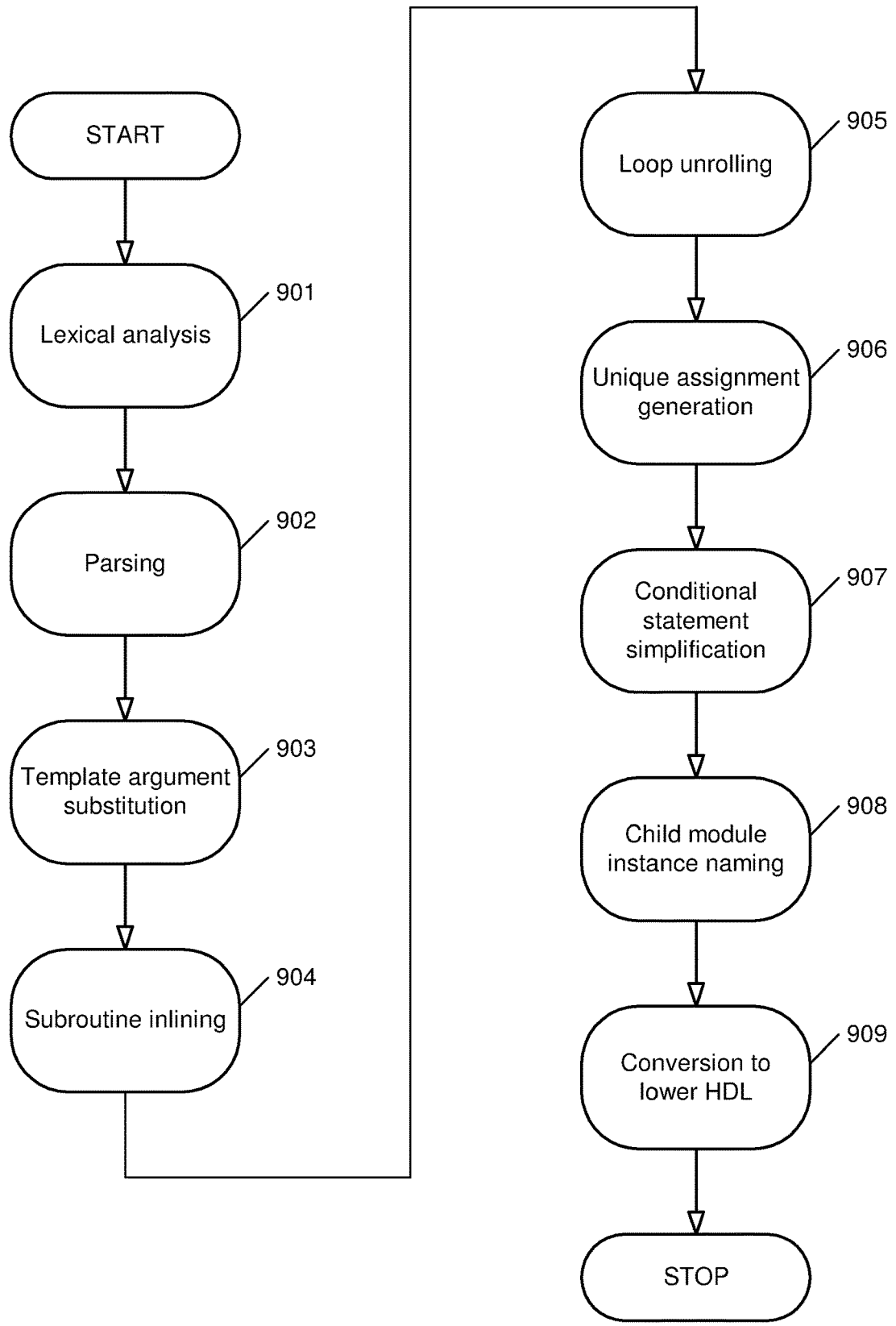

During synthesis, the preferred embodiment of the invention performs the following steps in sequence as shown in FIG. 9. Alternative optimised versions of the preferred embodiment may combine and/or reorder some of these steps.

Lexical analysis 901. The design is read in from file and split into lexical tokens according to the rules of C++.

Parsing 902. The lexical tokens are parsed and stored in a syntax tree according to the rules of the HDL of the invention.

Template argument substitution 903. A separate output module is generated for each combination of module template parameters occurring within the design. Each template argument is substituted for its actual value wherever is occurs in the body of the module. During this and all further steps any constant expressions or sub-expressions are evaluated and replaced with the expression result and then any statements which have no effect are eliminated. For example consider the follow module definition:

```
template <int N> void template_example(in<uvec<N>> a, out<uvec<N>> y) {
    y = a * a * (N + 1);
}
```

If the synthesis tool detects, either by module call inspection or through a configuration, that the template_example module is required to be output when N is 8 then this synthesis step will have the effect of converting the above code example into the following form:

```
void template_example_8(in<uvec<8>> a, out<uvec<8>> y) {
    y = a * a * 9;
}
```

Subroutine inlining 904. The preferred embodiment of the invention supports C++ function definitions and their associated function calls. These are distinct from module definitions and module instantiations in that a function definition arguments and its body are not allowed to include any logical constructs. During this step a function call is replaced with the body of its associated function and the function arguments are substituted.

Loop unrolling 905. All loops are unrolled by duplicating the contents of the loop up to the maximum number of times that the loop may be executed. Any nested loops are also all unrolled. For example consider the following example:

```
void loop_example(in<uvec<8>> a, in<uvec<8>> b, out<uvec<8>> y) {
    y = 0;
    for (int i = 1; i <= 2; i++) {
        if (a < i * 33) {
            y += (i % 2 == 0) ? a : b;
        }
        else {
            break;
        }
    }
}
```

After loop unrolling this synthesis step will have the effect of converting the above code example into the following form:

```
void loop_example(in<uvec<8>> a, in<uvec<8>> b, out<uvec<8>> y) {
    y = 0;
    if (a < 33) {
        y += b;
        if (a < 66) {
            y += a;
        }
    }
}
```

Unique assignment generation 906. Any signal variable which is assigned to more than once is given a new unique name for each assignment (by default by suffixing _1, _2 etc.) so that each signal name ends up just once on the left hand side of an assignment. For example consider the C++ code fragment:

```
uvec<8> b = a * 2;
b++;
b *= 5;
```

After unique assignment generation this synthesis step will have the effect of converting the above code example into the following form:

```
uvec<8> b = a * 2;
uvec<8> b_1 = b + 1;
uvec<8> b_2 = b_1 * 5;
```

Conditional statement simplification 907. Any conditional statements where the condition is a constant are simplified. If the condition is not constant then it is assigned to an internally generated signal variable as a predicate which is then used to condition all subsequent operations within the conditional statement. When a variable is assigned to within conditional branches the value of the variable is resolved when the branches rejoin by applying the relevant predicate(s). Because all logical constructs are input signal independent only simple statements such as variable definitions and assignments can occur within such conditional branches.

For example consider the C++ code fragment:

```
uvec<8> b = 3;
if (a >= 17) {
    b++;
}
else {
    b *= 2;
}
```

After conditional statement simplification this synthesis step will have the effect of converting the above code example into the following form:

```
uvec<8> b = 3;
bit pred_0001 = (a >= 17);
uvec<8> b_1 = b + 1;
uvec<8> b_2 = b * 2;
uvec<8> b_3 = pred_0001 ? b_1 : b_2;
```

C++ statements such as return, break and continue which interrupt the flow of control can be handled in a similar way by creating predicate variables which reflect the conditions under which the interruption occurs and using these to condition the execution of later statements.

Child module instance naming 908. Instance names are applied to any child modules and where the same instance name occurs more than once, the instance names are appended with _1, _2 etc. to make them unique.

For example consider the C++ code fragment:

```
for (int i = 0; i < 3; i++) {
    inst ("U1"); my_module (a, b, c, i);
}
```

After loop unrolling and child module instance naming this synthesis step will have the effect of converting the above code example into the following form:

```
inst("U1"); my_module (a, b, c, 0);
inst("U1_1"); my_module (a, b, c, 1);
inst("U1_2"); my_module (a, b, c, 2);
```

Conversion to lower HDL 909. The resulting module is converted to the lower HDL such as VHDL or Verilog and output to file. At this point the synthesis tool has already converted each module into a linear sequence of statements consisting of register definitions, signal definitions and signal assignments. Converting this into either VHDL or Verilog is now a straightforward process of converting the C++ syntax to its equivalent syntax in the lower HDL.

Comparison with Prior Art HDLs

There are a large number of different HDLs which can be broadly categorised as follows.

HDLs for Limited Design Domains

Some HDLs do not allow a full range of simulation and synthesis but instead focus on some limited aspect of hardware design. So there are languages which only handle simulation, or only create circuit net-lists, or only apply to a specific engineering domain such as digital signal processing. These HDLs do not provide the flexible range of features offered by the invention.

An example of this type of HDL is FP Compiler from Altera. This allows a floating point algorithm to be described in C which is then converted into a fully timed design ready for synthesis. It has a limited application domain of floating point calculations.

By comparison, the invention provides full support for all types of digital logic and can be used in any application domain to design for any type of device.

Event Driven HDLs

Event driven HDLs split the design into different tasks. During simulation, the execution of each task is triggered by one or more "events" such as a clock edge or the completion of another task. SystemC is an example of an event driven HDL.

An event driven HDL can be compatible with an existing software language (for example SystemC is compatible with C++). However the difference between the invention and event driven HDLs is in the efficiency and ease of debug of the simulation process.

In accordance with the invention, the simulation takes place in a simple software loop. The user can follow the process of simulation by single-stepping through the design or by setting software breakpoints using their normal software development tools. The flow of control through the design is simple to follow and the simulation runs fast because there is no event switching overhead.

In an event driven HDL there needs to be a central controller which coordinates and schedules the different tasks. Typically the control flow will jump around between these tasks in a hard to predict manner so debugging is harder. There is a performance overhead associated with the event switching.

Behavioural HDLs

Some HDLs operate at the behavioural abstraction level and automatically insert registers during synthesis based on configuration information which specifies timing and other requirements. The algorithms used for register insertion vary from HDL to HDL. Some HDLs insert a new register every time a new signal is created. Others insert registers and multiplexers so that expensive resources such as multipliers can be shared.

An example of this type of HDL is Vivaldo HLS from Xilinx. A design is written in C or C++ as an untimed description of the circuit functionality. The Vivaldo HLS compiler then converts this to a timed design by automatically inserting registers where needed to meet the overall clock speed requirements for the design.

The preferred embodiment of the invention operates at the RTL level of abstraction and therefore gives precise control over every register placement in the design. Other embodiments of the invention may operate at the behavioural level of abstraction but this would require an algorithm for how registers should be created during logic synthesis and the results from simulation of the design would then not be cycle-accurate.

HDLs with Multiple Threads or Processes

Many HDLs model the inherent parallelism in a hardware design by using multiple software threads or processes to model the different hardware blocks. The main benefit that this brings is that software wait statements may be used to suspend the execution of one thread or process at any location within the code. This can be used to implement a register scheme where the registers are the inherent state of the thread or process at the time of each halt. The SystemC HDL may be programmed to behave in this way by using the SC_THREAD macro.

The invention provides two significant advantages over this approach. Firstly, the invention avoids the simulation time overheads associated with thread or process switching. Secondly the invention is easier to debug because it is single threaded.

HDLs Based on Functional Programming Languages

Some HDLs have been based on functional programming languages such as Haskell. The benefit of functional languages is that they have an inherent parallelism which makes them a natural choice for hardware design. Their big drawback is that for the majority of software engineers they are hard to program effectively especially for larger designs.

Also functional languages tend to simulate slower than sequential languages such as C++ because sequential language compilers tend to be far better optimised.

Other HDLs

Finally there are a variety of HDLs which do not fit any of the above patterns. Some HDLs do not support registers. Some handle asynchronous logic only. Some are generator languages which need to be executed to generate an actual design. None of these solutions provide the same ability as the present invention to describe almost all possible designs in a way which can be directly and efficiently simulated.

The invention claimed is:

1. A computer-implemented system for facilitating the design of a digital circuit which comprises a plurality of logical constructs, wherein the system is configured such that each time each logical construct is executed during a software simulation pass it is associated with a unique tag, wherein each tag is configured to correspond to a physical aspect of a hardware representation of the design,
wherein the logical construct is:
a clock signal;
a reset signal;
a register;
a memory block;
a wire, wherein a wire is a mechanism which enables a signal to be read before it is written;
a tri-state signal;
a module instantiation with an associated name;
a module input signal;
a module output signal;
a module tri-state input and output signal;
a sensitivity list; and/or
a debugging element.

2. The system according to claim 1, wherein:
the simulation is performed by repeated execution passes through code which implements the design; and/or
the same tags are associated with corresponding executions of the logical constructs during different simulation passes.

3. The system according to claim 1, wherein the system is further configured to ensure that the tagged logical constructs can only occur within portions of code which are not conditional upon the state of any input signal.

4. The system according to claim 1, wherein the system comprises:
a simulation component;
a synthesis component;
a specification for a hardware description language (HDL);
a set of syntactic and semantic rules for an HDL;
a simulation software library; and/or
a synthesis conversion tool.

5. The system according to claim 1, wherein the system is arranged to maintain information relating to the status of a simulation of the design.

6. The system according to claim 1, wherein the system is configured to generate at least one simulator object arranged to maintain data relating to a simulation of the design.

7. The system according to claim 6, wherein the system is further configured to generate a sole manager object, wherein the manager object has access to, and/or is in communication with, the at least one simulator object.

8. The system according to claim 1, wherein the system is configured to:
i) facilitate the design of the digital circuit using a programming language;
optionally wherein the programming language is C++, a C-type language or an object-oriented language;
ii) convert a design written in the programming language to a hardware design;
iii) create a representation of the digital circuit in a programming language
iv) compile or synthesize the design of the digital circuit into a hardware design;
v) use, represent and/or manipulate an RTL abstraction of the digital circuit; and/or
vi) determine when a steady-state has been reached and that the circuit is stable during a simulation.

9. The system according to claim 1, wherein the system is configured such that:
a simulator object is able to store and/or maintain simulation state by retrieving it from a sole manager object;
a logical construct object is able to retrieve its initial state from the simulator object on construction and save its state on destruction; and
logical constructs can only occur within portions of code which are not conditional upon the state of any input signal.

10. A computer-implemented method for facilitating the design of a digital circuit which comprises a plurality of logical constructs, wherein the method comprises:
assigning a unique tag to each logical construct, the same tag being assigned to the same logical construct each time the logical construct is executed during a software simulation pass,
wherein each tag is configured to correspond to a physical aspect of a hardware representation of the design,
wherein the logical construct is:
a clock signal;
a reset signal;
a register;
a memory block;
a wire, wherein a wire is a mechanism which enables a signal to be read before it is written;
a tri-state signal;
a module instantiation with an associated name;
a module input signal;
a module output signal;
a module tri-state input and output signal;
a sensitivity list; and/or
a debugging element.

11. The method according to claim 10, wherein the method comprises:
simulating the design by repeatedly performing execution passes through code which implements the design; and/or
associating the same tags with corresponding executions of the logical constructs during different simulation passes.

12. The method according to claim 10, wherein the method comprises ensuring that the tagged logical constructs can only occur within portions of code which are not conditional upon the state of any input signal.

13. The method according to claim 10, wherein the method comprises the use of:
a simulation component;
a synthesis component;
a specification for a hardware description language (HDL);
a set of syntactic and semantic rules for an HDL;
a simulation software library; and/or
a synthesis conversion tool.

14. The method according to claim 10, further comprising maintaining information relating to the status of a simulation of the design.

15. The method according to claim 10, further comprising generating at least one simulator object arranged to maintain data relating to a simulation of the design.

16. The method according to claim 15, further comprising generating a sole manager object, wherein the manager object has access to, and/or is in communication with, the at least one simulator object.

17. The method according to claim 10, wherein the method comprises at least one of:
   i) using a programming language to facilitate the design of the digital circuit;
   optionally wherein the programming language is C++, a C-type language or an object-oriented language;
   ii) converting a design written in the programming language to a hardware design;
   iii) creating a representation of the digital circuit in a programming language
   iv) compiling or synthesizing the design of the digital circuit into a hardware design;
   v) using, representing and/or manipulating an RTL abstraction of the digital circuit; and
   vi) determining when a steady-state has been reached and that the circuit is stable during a simulation.

18. The method according to claim 10, wherein the method comprises:
   enabling a simulator object to store and/or maintain simulation state by retrieving it from a sole manager object;
   enabling a logical construct object to retrieve its initial state from the simulator object on construction and save its state to the simulator object on destruction; and
   ensuring that logical constructs can only occur within portions of code which are not conditional upon the state of any input signal.

19. A computer-implemented system for simulating and/or synthesizing the design of a digital circuit which comprises a plurality of logical constructs, wherein the system is configured such that:
   a simulator object is able to store and/or maintain simulation state by retrieving it from a sole manager object;
   a logical construct object is able to retrieve its initial state from the simulator object on construction and save its state on destruction; and
   logical constructs can only occur within portions of code which are not conditional upon the state of any input signal.

20. A computer-implemented method for simulating and/or synthesizing the design of a digital circuit which comprises a plurality of logical constructs, comprising:
   enabling a simulator object to store and/or maintain simulation state by retrieving it from a sole manager object;
   enabling a logical construct object to retrieve its initial state from the simulator object on construction and save its state to the simulator object on destruction; and
   ensuring that logical constructs can only occur within portions of code which are not conditional upon the state of any input signal.

* * * * *